United States Patent
Drewett et al.

(10) Patent No.: US 11,614,326 B2
(45) Date of Patent: Mar. 28, 2023

(54) SENSOR SYSTEM, SENSING ELEMENT AND METHODS

(71) Applicant: Senceive Ltd, London (GB)

(72) Inventors: Thomas Anthony Drewett, Brisbane (AU); Bryn Anthony Smith, Kensington (AU); Dimitrios Andreou, Thessaly (GR)

(73) Assignee: Senceive Ltd, London (GB)

( * ) Notice: Subject to any disclaimer, the term of this patent is extended or adjusted under 35 U.S.C. 154(b) by 0 days.

(21) Appl. No.: 17/618,980

(22) PCT Filed: Jun. 12, 2020

(86) PCT No.: PCT/GB2020/051424
§ 371 (c)(1),
(2) Date: Dec. 14, 2021

(87) PCT Pub. No.: WO2020/249965
PCT Pub. Date: Dec. 17, 2020

(65) Prior Publication Data
US 2022/0307830 A1    Sep. 29, 2022

(30) Foreign Application Priority Data
Jun. 14, 2019  (GB) ..................... 1908596

(51) Int. Cl.
*G01C 9/08* (2006.01)
*G01C 7/06* (2006.01)
*G01C 9/06* (2006.01)

(52) U.S. Cl.
CPC .............. *G01C 9/08* (2013.01); *G01C 7/06* (2013.01); *G01C 9/06* (2013.01)

(58) Field of Classification Search
CPC .............. G01C 9/06; G01C 9/08; G01C 7/06
(Continued)

(56) References Cited

U.S. PATENT DOCUMENTS 6,631,563 B2 * 10/2003 Brosnahan ............ E21B 47/022
  33/324
6,843,318 B2 * 1/2005 Yarbro ................. E21B 47/024
  166/255.2
(Continued)

FOREIGN PATENT DOCUMENTS

JP    2002 318114 A    10/2002
JP    2011 169705 A    9/2011

OTHER PUBLICATIONS

Soil Instruments, "Smart In-Place Inclinometer (IPI) User Manual," http://www.itmsoilsupport.com/manuals/Man233_Smart_In-Place_Inclinometer_(IPI).pdf.
(Continued)

*Primary Examiner* — George B Bennett
(74) *Attorney, Agent, or Firm* — Renner, Otto, Boisselle & Sklar, LLP

(57) ABSTRACT

Techniques are disclosed for disseminating network service-specific mapping information across administrative domains. In one example, a network device receives an indication of a route target and one or more underlay tunnels configured to support a service route. The service route is configured to transport network traffic associated with a first network service of a plurality of network services. The network device defines, based on the indication, a first transport class of a plurality of transport classes. The network device receives a service route for the first network service and stores a correspondence between the service route and the first transport class. The network device receives network traffic associated with the first network service and forwards, based on the correspondence, the network traffic along the underlay tunnels specified by the first transport class.

20 Claims, 9 Drawing Sheets

(58) Field of Classification Search
USPC .................................................. 33/302, 304
See application file for complete search history.

(56) References Cited

U.S. PATENT DOCUMENTS

| | | | | |
|---|---|---|---|---|
| 7,975,392 | B1* | 7/2011 | Spaulding | G01C 21/165 |
| | | | | 33/313 |
| 8,489,333 | B2* | 7/2013 | Bonavides | G01V 11/005 |
| | | | | 702/6 |
| 8,544,181 | B2* | 10/2013 | Detournay | E21B 47/022 |
| | | | | 33/313 |
| 9,689,256 | B2* | 6/2017 | Tevis | E21B 49/06 |
| 9,777,568 | B2* | 10/2017 | Danisch | E02D 31/00 |
| 10,113,413 | B2* | 10/2018 | Viens | E21B 47/022 |
| 10,221,675 | B2 | 3/2019 | Danisch | |
| 2005/0284221 | A1 | 12/2005 | Danisch et al. | |
| 2016/0123134 | A1* | 5/2016 | Viens | E21B 47/022 |
| | | | | 175/45 |
| 2022/0349257 | A1* | 11/2022 | Muona | E21D 9/003 |

OTHER PUBLICATIONS

Sisgeo BH Profile IPI Inclinometers, "Inclinometers & Pendulums," Nov. 2018, https://www.sisgeo.com/uploads/schede/schede/S430_EN_06_BH_profile_inclinometers_.pdf.
International Search Report and Written Opinion of the International Searching Authority for corresponding International Patent Application No. PCT/GB2020/051424, dated Oct. 21, 2020.

* cited by examiner

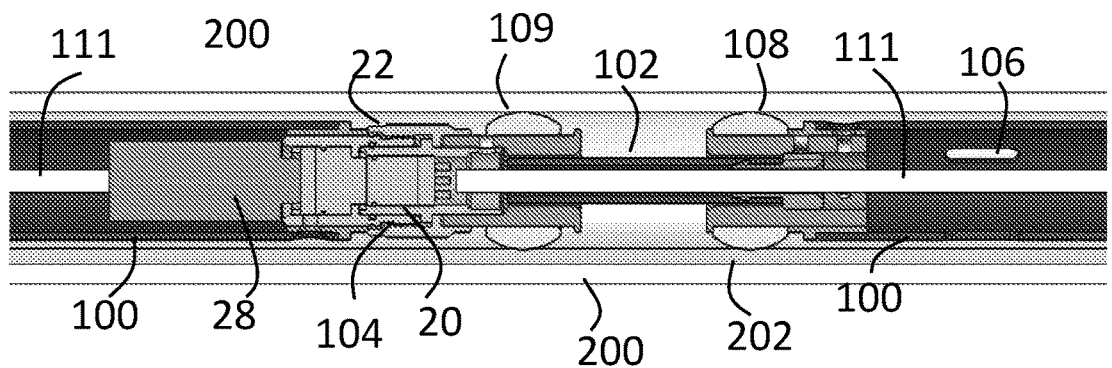
Figure 11A
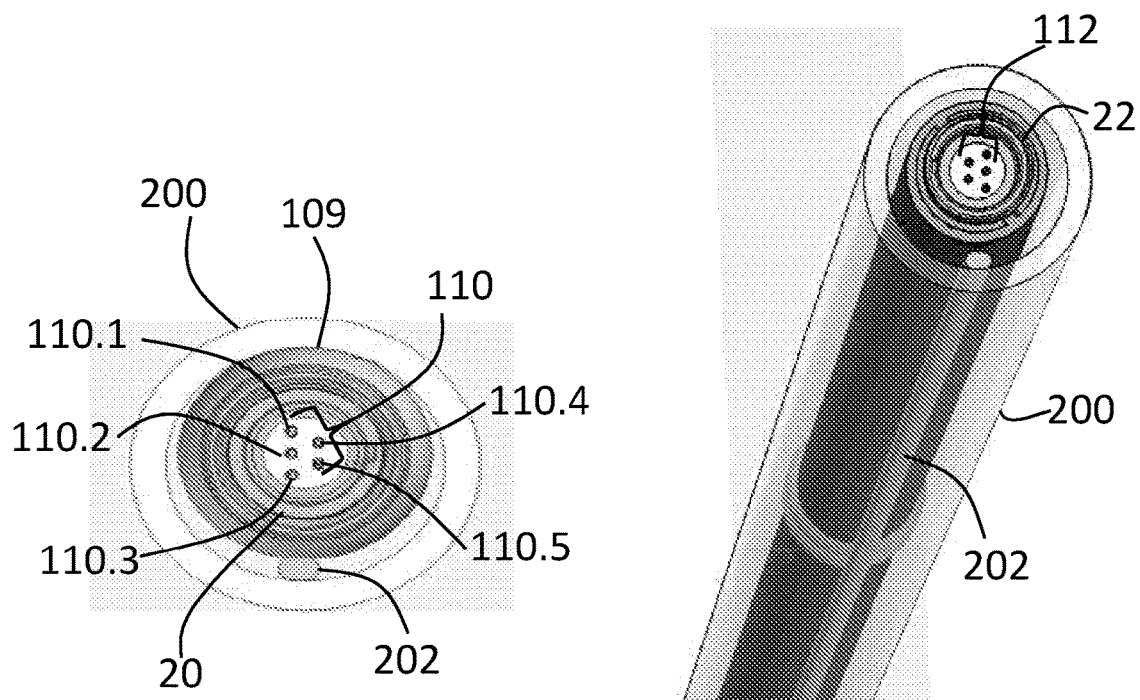
Figure 11B
Figure 11C

SENSOR SYSTEM, SENSING ELEMENT AND METHODS

This application is a national phase of International Application No. PCT/GB2020/051424 filed Jun. 12, 2020, which claims priority to GB Patent Application No. 1908596.8 filed Jun. 14, 2019, each of which is hereby incorporated herein by reference in its entirety.

FIELD OF THE INVENTION

The present invention relates to sensor systems comprising a plurality of sensing elements which are linked together to form a chain.

In some applications the chain of sensing elements is deployed to measure a change in a structure such as a building, foundation borehole and the like.

BACKGROUND OF THE INVENTION

The construction industry uses borehole measurement instrumentation to measure for ground movements.

Existing devices for providing borehole measurement include in-place inclinometers. These in-place inclinometers include a wheel assembly including a fixed wheel and a sprung wheel and a sensor body. In-place inclinometers are used in conjunction with conventional in-place inclinometer tubing. In-place inclinometer tubing is typically a hard plastic tube having at least two opposing longitudinally extending channels or runners which fit the wheels of the in-place inclinometer device. This restricts or prevents twisting of the in-place inclinometer.

Examples of such devices are such as those described in "http://www.itmsoilsupport.com/manuals/man233_Smart_In-Place_Inclinometer_(IPI).PDF", "http://www.sisgeo.com/uploads/schede/schede/S430_EN_06_BH_profile_inclineometers_.pdf".

Existing in-place inclinometer systems can be assembled on site, with the order of the device elements being recorded as the chain is assembled. For these in-place inclinometer systems, it is not possible to verify the ordering of the chain of device elements once the chain is installed in a borehole and so any errors in recording the ordering lead to erroneous analysis. In some similar related systems a chain of device elements are permanently linked in a particular order during manufacture. Therefore the order of the device elements is known prior to installation. For these systems reuse of the chain of device elements is limited to specific boreholes as the length of the chain is fixed.

Examples of such devices are such as those described in U.S. Pat. Nos. 9,777,568 and 10,221,675.

Additionally, deployment of existing chains of device elements may require machinery to enable safe insertion or attachment to structures. For example, typical weights for device elements can be around 2.5 kg. Therefore a chain of 30 such device elements may weigh around 75 kg.

SUMMARY OF THE INVENTION

According to a first aspect of certain embodiments there is provided a sensor system comprising a plurality of sensing elements configured when deployed to be connected together to form a chain, and a control element configured when deployed to be connected to the plurality of sensing elements of the chain. Each of the plurality of sensing elements comprise a housing and first and second interfaces. Each of the first and the second interfaces being configured to form an electrical and a physical connection to a corresponding interface of another of the plurality of sensing elements or the control element to form the chain. Each of the plurality of sensing elements also comprise electrical circuitry formed within the housing. The electrical circuitry comprises at least one sensor configured to generate an indication of a relative orientation and tilt of the sensing element and control circuitry configured to control communication of signals via one or both of the first interface and the second interface to at least one of the other sensing elements and/or the control element. The signals communicated via one or both of the first interface and the second interface to the at least one of the other sensing elements and/or the control element include an identification signal for identifying the sensing element and the indication representing the orientation and the tilt of each of the plurality of sensing elements in the chain. The above described aspect provides a chain array of sensor elements configured to provide both information relevant to the respective sensor elements identification and also the orientation of the sensor element, such that the change in shape of the chain can be determined.

According to another aspect of certain embodiments there is provided a sensor system where the electrical circuitry of each of the plurality of sensing elements comprises transceiver circuitry configured to communicate the signals via a communications bus formed between the first interface and the second interface. The electrical circuitry also comprises addressing circuitry configured to be operable to communicate the identification signal with one of the group consisting of a first neighbouring sensing element or a second neighbouring sensing element of the plurality of sensing elements of the chain to which the sensing element is connected via the first or the second interfaces, respectively. The addressing circuitry is configured to be operable to receive a second identification signal from one of the group consisting of a first neighbouring sensing element or a second neighbouring sensing element of the plurality of sensing elements of the chain to which the sensing element is connected via the first interface or the second interface, respectively. The sensor system is in accordance with the first aspect summarised above. Advantageously, the aspect provides two separate mechanisms for facilitating communication, including a first communication mechanism for communicating with all elements of the chain and a second communication mechanism for communicating only with nearest neighbours of the chain.

According to another aspect of certain embodiments there is provided a sensor system in accordance with the second aspect summarised above where the first and second interfaces comprise a first set of one or more electrical contacts for facilitating communications via the communications bus, and a second set of one or more electrical contacts for facilitating communications via the addressing circuitry. The one or more electrical contacts of the second set are different to those of the first set. Advantageously, the aspect provides an interface connections which physically, separate signals transmitted via the first and second communication mechanisms.

According to another aspect of certain embodiments there is provided a sensor system in accordance with any of the aspects summarised above. The electrical circuitry comprises an electrical energy store. The control circuitry is configured to determine a charge state of the electrical energy store. The control circuitry is configured to determine whether the charge state exceeds a threshold and to prevent activation of transceiver circuitry if the charge state of the electrical energy store does not exceed the threshold. The electrical energy store may preferably be a capacitor. Advantageously, the aspect reduces the wastage of energy, by reducing the likelihood of incomplete messages being transmitted.

According to another aspect of certain embodiments there is provided a sensing element comprising a housing and first and second interfaces at either of two ends of the housing. Each of the first and the second interfaces being configured to form an electrical and a physical connection to a corresponding interface of another of the plurality of sensing elements ora control element. The sensing element also comprises electrical circuitry formed within the housing. The electrical circuitry comprising at least one sensor configured to generate signals representing a relative orientation and tilt of the sensing element, and control circuitry configured to facilitate communications via one or both of the first interface and the second interface to at least one of the other sensing elements and/or the control element to which the sensing element is connected. The above described aspect provides a sensor element for use in a chain configured to provide both information relevant to the respective sensor elements identification and also the orientation of the sensor element, such that the change in shape of the chain can be determined.

According to another aspect of certain embodiments there is provided a sensing element comprising a housing including a hollow section, the hollow section comprising one or more vents for allowing air to be displaced from the interior of the hollow rigid body in the presence of water. The sensing element also comprises first and second interfaces at either of two ends of the housing, each of the first and the second interfaces being configured to form an electrical and a physical connection to a corresponding interface of a different sensing element. The sensing element also comprises electrical circuitry formed within the housing. The electrical circuitry comprising at least one sensor configured to generate signals representing a relative orientation and tilt of the sensing element, and communication circuitry configured to transmit generated signals from the sensor via the first or second interface. Advantageously, the described aspect provides a sensor element which is configured to lack buoyancy in water, such that erroneous readings are prevented.

It will be appreciated that features and aspects of the disclosure described above in relation to the first and other aspects of the disclosure are equally applicable to, and may be combined with, embodiments of the disclosure according to other aspects of the disclosure as appropriate, and not just in the specific combinations described above.

BRIEF DESCRIPTION OF THE DRAWINGS

Various embodiments of the invention will now be described in detail by way of example only with reference to the following drawings:

FIGS. 11A, 11B and 11C are representations showing different views and example configurations of the connectors between the sending elements corresponding to the diagram shown in FIG. 10;

DETAILED DESCRIPTION

Figure 1:
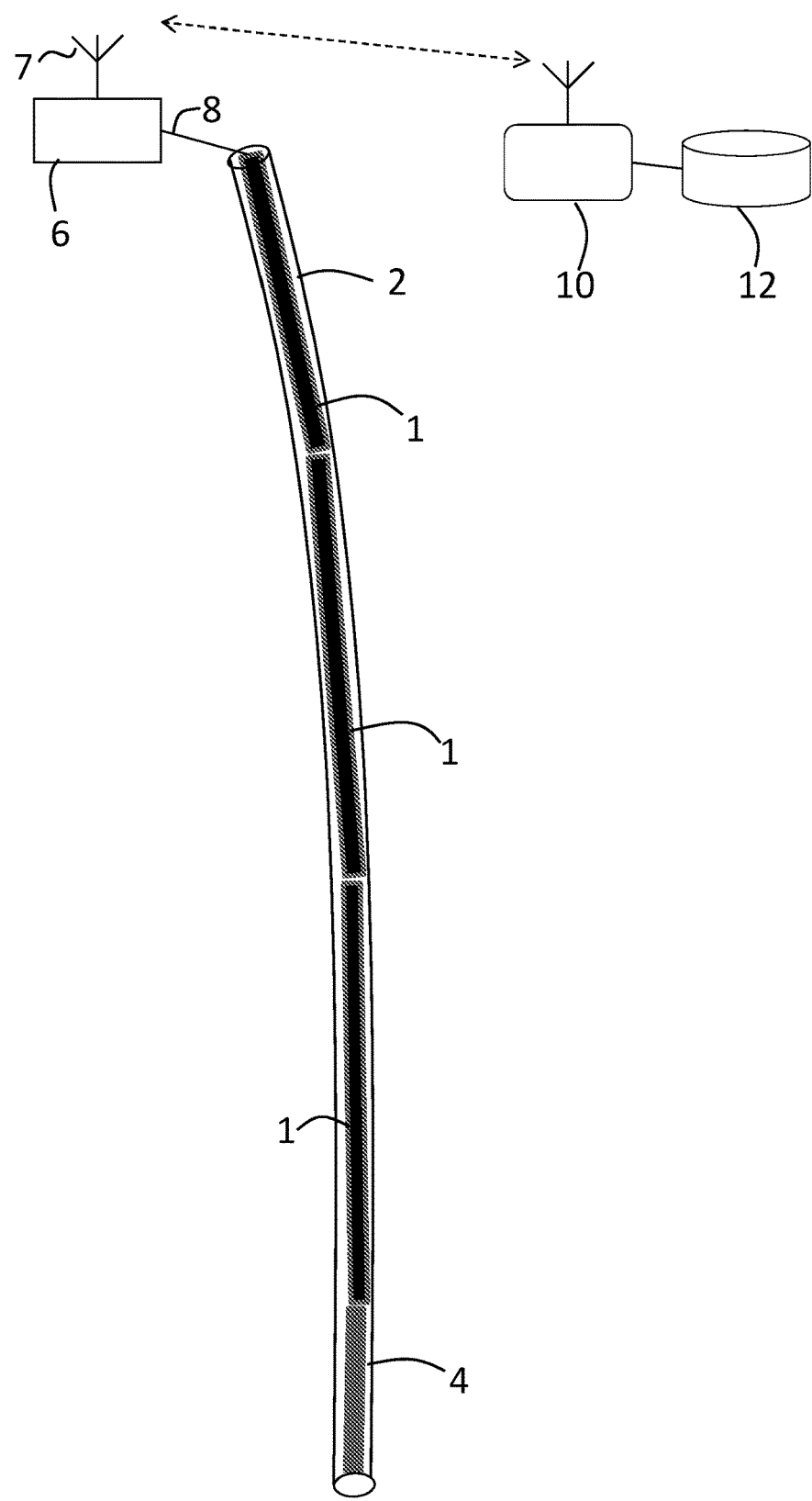
FIG. 1 is a schematic block diagram of a sensor system according to an example embodiment of the present technique.

As indicated above, embodiments of the present application are directed to detecting deformation or changes in earth, structural parts of buildings, or other major structures which would otherwise be difficult to monitor. An example is shown in FIG. 1 in which a sensor system is used to monitor changes in shape or distortion of a vertical or horizontal borehole, which may, for example, be or form part of foundations of a large building. Other example uses include measuring displacement of arch or tunnel profiles.

As shown in FIG. 1, a plurality of sensing elements 1, or segments, are disposed within a borehole 2. Although there are only three sensing elements shown within the borehole 2 in FIG. 1, it will be appreciated that any number of sensing elements can be used to form the sensing or sensor system. For example, there thirty or more sensing elements may be provided for use in the sensor system. The sensing elements 1 are connected together to form a chain which is terminated by a terminating element 4 configured to protect the final sensing element of the chain's connector from environmental damage, and to provide an electrical termination for the communication bus. As an example, for differential communications buses (for example, CAN and RS-485) the terminating element may include a resistor which acts to passively return a voltage across two lines of the bus to 0 V. Such a terminating resistor is provided at each end of the differential communications bus. In some examples, the terminating element may also be configured to indicate the element's terminal position in the chain. In the example of FIG. 1, a first of the sensing elements 1 is connected to a control element or node 6 via an interface 8. The sensing elements are connected together, and to the control element, by an interface which allows both electrical and physical connection of the sensing elements in the chain. While not shown, in other examples the control element may be connected as an intermediate or non-terminal element in the chain.

As will be explained shortly, data including signals providing an indication of a relative orientation or tilt of the each of the sensing elements as well as a means of identifying each of the sensing elements is communicated up the chain to the control element 6. As shown, the control element may include a wireless transceiver and antenna 7 operable to transmit data to a remote processing unit 10 which may include a server element 12 which stores other information. In some examples, not shown, the control element 6 may be in communication via a wired link, with a (remote) processing unit, and/or to a separate communications facility for facilitating communications with a remote processing unit. Furthermore, in some examples, the control element may retain data received from each sensing element and provide said retained data to an external device periodically upon request. Said data may, in some examples, be transmitted to the external device via a data port (e.g. the device may be a portable storage drive or portable computing device, and the control element may include a USB port or similar). In some other examples the data may be transmitted via a wireless transceiver included within the control element or provided as part of a separate communications facility in communication with the control element. Embodiments of the present technique therefore relate to a sensing system such as that shown in FIG. 1 in which technical advances are provided in being more easily able to deploy the sensing elements and, also, once deployed, to monitor of a structure such as the borehole 2.

The sensing elements shown in FIG. 1 are modular segments in that they may be assembled (and dissembled) and their particular ordering automatically identified to provide chains of a desired length dependent on the requirements of the structure and environment to be monitored. Furthermore, the sensing elements may be provided in different sizes (for example, sensing elements may have an elongated direction measuring 0.5 m, 1 m, 2 m or 3 m in length). By changing the length of sensing elements, the sensitivity of a chain formed from the sensing elements may be adjusted as required. For example, a critical region of a structure or borehole may be provided with more, shorter, sensing elements providing greater spatial resolution while a less critical region may be provided with fewer, longer, sensing elements providing reduced spatial resolution. Furthermore, due to their modular nature, chains of sensing elements may be rearranged and automatically re-identified in different configurations to meet different site or structural requirements.

As an example, the number of sensing elements required to measure a borehole will depend upon the length/depth of the borehole and the size of the segments to be used. Boreholes typically vary in length/depth from a few metres up to a few hundred metres. In general, a borehole for use in monitoring a large civil engineering structure will have a depth/length of less than 100 m. As an example, it will be appreciated that for a borehole having a length/depth of 30 m, various configurations of sensing elements could be used. For example, the borehole could be measured by 30×1 m sensing elements, 10×3 m sensing elements, or a combination of 12×1 m sensing elements and 6×3 m sensing elements. It will also be appreciated that while an ordered arrangement (i.e. first 1 m segments, then 3 m segments) may be preferable in some circumstances; there is no requirement for such an ordering as it is possible to identify the position of each sensing element in the chain after deployment.

Electrical Characteristics

Figure 2:
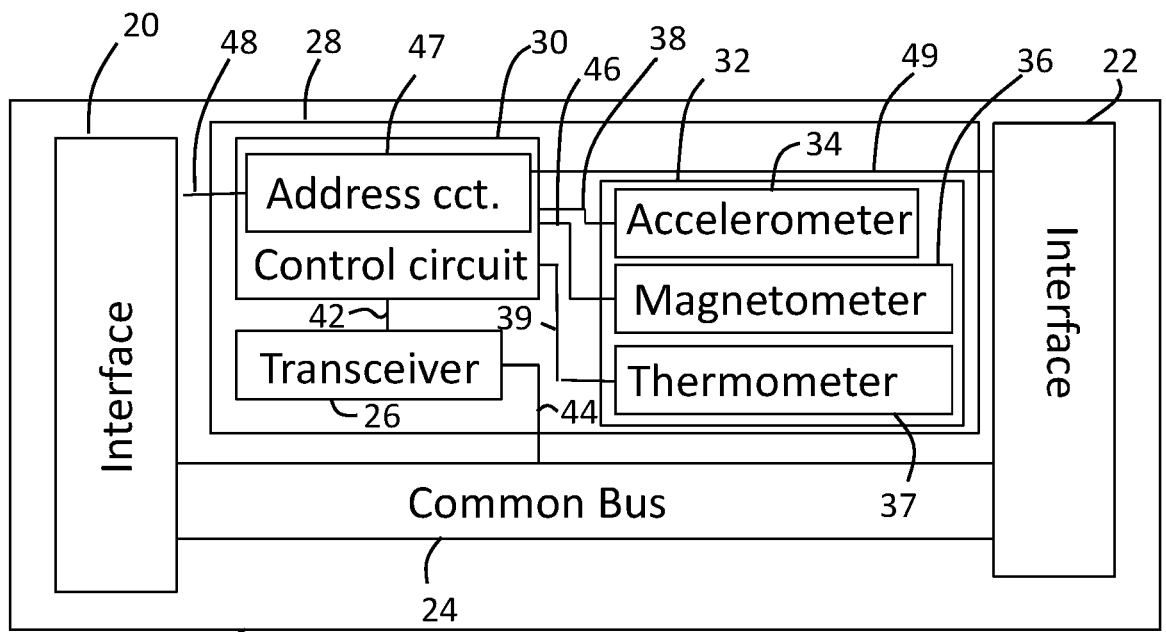
FIG. 2 is a schematic block diagram of a sensing element which forms a chain of sensing elements as shown in FIG. 1.

A system diagram of one of the sensing elements 1 of the chain in FIG. 1 is shown in FIG. 2. As shown in FIG. 2, each of the sensing elements 1 includes a first interface 20 at one end of the sensing element 1 and a second interface 22 at the other end of the sensing element 1. As shown in FIG. 1 the sensing elements 1 are formed in a substantially elongate shape and may be configured to be rigid between joints of the chain. The sensing elements 1 may also be constructed from a lightweight material. For example, a portion of the sensing element may be fabricated from carbon fibre in the shape of a rod. A one metre sensing element may have a weight of approximately 250 g. A chain of 30 one metre segments may therefore have a weight of around 7.5 kg. Advantageously, a typical chain of 30 sensing elements 1 can be installed by hand without the need for machinery.

As shown in FIG. 2 the sensing elements also include a common or communications bus 24 which provides a facility for communicating electrical signals between first and second interface 20 and 22. The sensing element 1 also includes electrical circuitry 28 which may be formed on a printed circuit board (PCB) or other integrated circuit. The electrical circuitry 28 includes a controller circuit 30 and a transceiver circuit 26. The electrical circuitry may also include sensor circuitry 32 which includes an accelerometer 34, a magnetometer 36 and a thermometer 37 (i.e. a temperature sensor). In some examples sensor circuitry 32 may also include other sensors; for example a gyroscopic sensor, a vibration sensor, and a pressure sensor. The accelerometer magnetometer and thermometer 34, 36, 37 are connected respectively to the control circuitry 30 via interfaces 38, 46, 39. The controller circuitry 30 is connected to the transceiver circuitry 26 via a separate interface 42. The transceiver circuitry 26 is connected to the common bus 24 by an interface 44.

The controller circuitry 30 includes an addressing circuit 47, which is connected to a first interface 20 and a second interface 22 by a first channel 48 and a second channel 49, respectively. The addressing circuit 47 and the first and second channel 48, 49 provide a facility for each sensing element to communicate electrical signals with its nearest neighbouring elements (i.e. a neighbouring sensing element or the control element 6) to which it is directly connected via the first and/or second interfaces 20,22. The controller circuit 30 is only able to communicate directly with nearest neighbours via addressing circuit 47 and is not able to communicate with next-nearest neighbours or any other element of the chain. This ensures that communications (i.e. one or more signals) received via the addressing circuit 47 were transmitted from one of the nearest neighbour elements.

In some examples, the controller circuitry 30 may be configured to receive electrical signals from a neighbouring element connected with interface 20 via the first channel 48 (input), and may be configured to send electrical signals to a neighbouring element connected with interface 22 via the second channel 49 (output). Based on the received signals the controller circuitry 30 and/or the control element 6 may be able to identify which neighbouring element is attached to interface 20. Similarly, a neighbouring element connected to interface 22 may be able to identify (or the control element 6 may be able to identify) that it is attached to the sensing element which sent the signal. In other examples the controller circuitry may be configured to receive electrical signals via channel 49 and send via channel 48. In still other examples the controller circuitry may be configured to send and receive via both channels 48, 49 (although may only send in one direction for simplicity).

Communications between different sensing elements via addressing circuitries 47 provide a mechanism for determining the nearest neighbours of each of the sensing elements. The identification of neighbour relationships can be used by the control element 6 or a separate analysis processor, such as remote processing unit 10, to determine the ordering of the chain of sensing elements. Example methods and algorithms for identifying the order are discussed in detail further below. However, in summary, if each sensing element is able to identify at least one neighbour (e.g. each sensing element identifies its downstream neighbour) then analysis can be performed (e.g. by the control element 6 or a remote analysis processor such as remote processing unit 10) to determine the ordering of the chain of sensing elements. In other examples each sensing element may perform analysis to determine its relative position in the chain and/or the ordering of the chain. As a specific example of a chain having five sensing elements, if:

element A identifies element D as its downstream neighbour;

element B identifies element A as its downstream neighbour;

element C identifies element E as its downstream neighbour;

element D identifies that it does not have a downstream neighbour or fails to identify a downstream neighbour; and element E identifies element B as its downstream neighbour; then analysis performed based on the identified neighbour relationships determines that the order of elements is C, E, B, A, D. Advantageously, the present system allows for the ordering of the sensing elements in a chain to be determined after installation/deployment and without user input (i.e. without the user having to record the order of segments when the chain is assembled).

In some examples, the controller circuitry 30 may also be configured to send and receive further electrical signals with neighbouring elements connected through either the first channel 48 and the second channel 49. In these examples the addressing circuity 47 can be used for general communication between elements (for example, in the event that the common bus fails or is damaged).

As shown in FIG. 2 and as will be appreciated from the system diagram shown in FIG. 1, each of the sensing elements 1 includes the first and second interfaces 20, 22 which are configured with a common configuration to provide electrical and physical connection to a corresponding interface on another sensing element 1. Thus as shown in FIG. 1 the middle sensing element in the chain is connected to both an upper and a lower sensing element via the common interfaces 20, 22 whereas the first sensing element 1 is connected to the control element 6 via the interface 8 and the last sensing element 1 is connected to the terminating element 4 by the common interface.

As will be explained in the following paragraphs, embodiments of the present technique provide an arrangement in which the sensing elements 1 can be disposed within a structure, such as a borehole 2, and are self-configuring in that the controller circuit 30 transmits information on the common bus, identifying the sensing element and at least one other sensing element connected to the sensing element (based on signals sent via the first channel 48 and the second channel 49). This information is transmitted along the common bus 24 via the interfaces 20, 22 through the chain of sensing elements to the control element 6 where this information may be processed to identify each of the sensing elements and determine their order in the chain of sensing elements. Alternatively, the control element 6 may transmit the information received from the chain of sensing elements to a remote analysis processor which can therefore identify each of the sensing elements and determine their order in the chain of sensing elements. As such, it will be appreciated that the determination of the ordering of the sensing elements of the chain may be performed by either the control element 6, the remote analysis unit 10, or by a combination of the two.

Furthermore, in order to allow the sensing elements to be disposed in any position within the target structure (e.g. borehole 2), signals from the accelerometer 34 and magnetometer 36 which are fed to the control circuit 30 are processed and transmitted, via the transceiver 26, through the common bus 24 along the chain of sensing elements so that each of the sensing elements provides measurements from their respective accelerometer 34 and magnetometer 36. The sensed signals from the accelerometer 34 and magnetometer 36 provide an indication of a tilt and orientation of each of the sensing elements in the chain of sensing elements. For example, the accelerometer will be used to measure angular displacement or tilt of the sensing element while the magnetometer will also be used for determining the actual orientation of the sensing element inside the deployed environment (e.g. with respect to magnetic north). Analysis combining the sensed signals from the accelerometer 34 and magnetometer 36 allows for the absolute orientation, including twist, to be determined for each sensing element in three dimensions. As an example, the accelerometer 34 may be a Kionix KXR94-2283 and the magnetometer 36 may be a Honeywell HMC5883 L magnetometer. In some examples, signals from the thermometer 37 may also be fed to the control circuit 30 for processing and transmission, via the transceiver 26, through the common bus 24 along the chain of sensing elements.

In some examples, all sensing elements in the chain will be sampled in a synchronised manner for accurate representation of any deformation across the chain. Once the sampling procedure finishes, all sensing elements will report the data to the control element (via the common bus) for further processing and data forwarding to the remote station. The sensed signals can be analysed and the respective orientation of each of the sensing elements in the chain calculated. The analysis can be performed by the transceiver unit 6, the remote station 10 or a combination of the two. For example, the calculations required for deriving the tilt and orientation results for each sensing element may take place at the control element 6 as soon as all the data have been collected from all available sensing elements. Once the control element 6 performs the calculations, the processed data will be forwarded again to the remote station 10 for further processing and data visualisation. Accordingly, measurement and analysis of movement after deployment of the sensing elements in the chain provides an indication of deformation or other change in the structure/environment.

Figure 3:
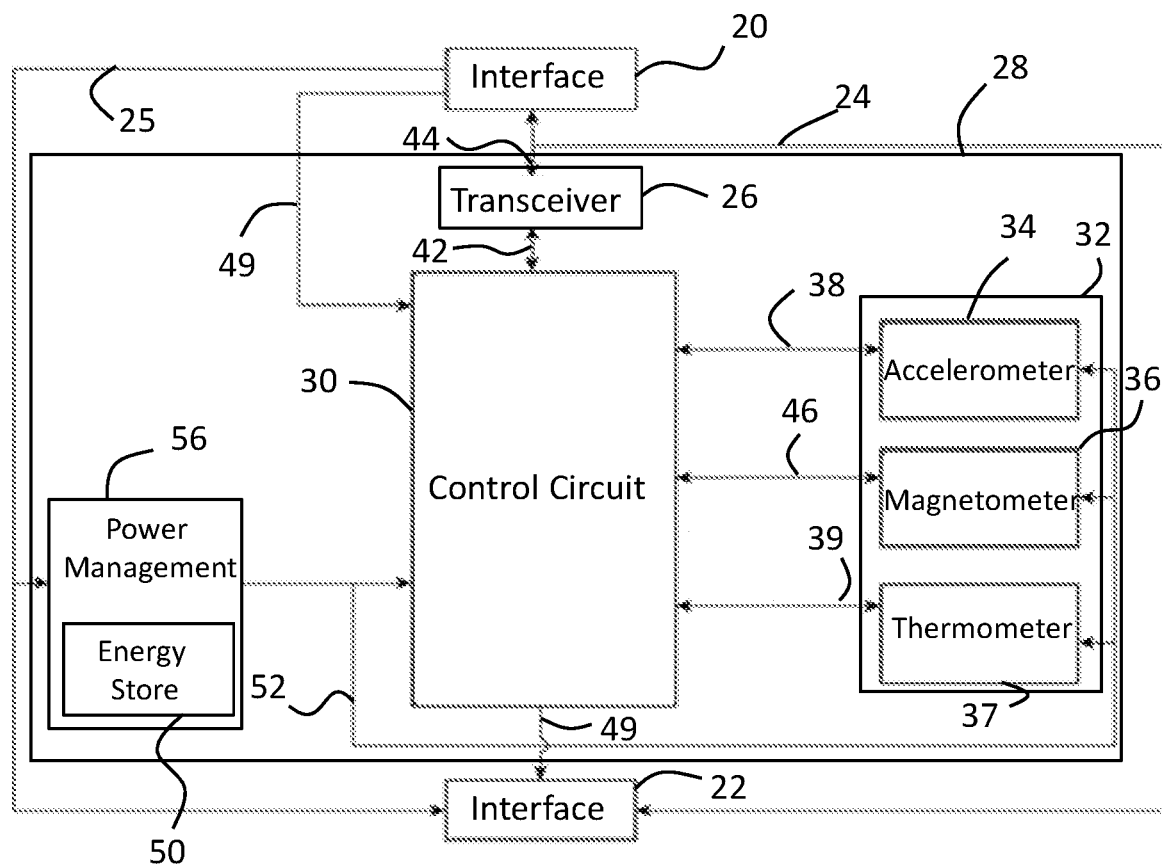
FIG. 3 is a schematic block of showing electrical components of the sensing element shown in FIG. 2 in more detail.

A more detailed example of the electrical circuits 28 which is formed within each of the sensing elements 1 is shown in FIG. 3. As shown in FIG. 3 the control circuit 30 is a microcontroller (MCU). The sensor circuitry 32 is shown to comprise a magnetometer 36, an accelerometer 34 and a thermometer 37. As shown in FIG. 3 the magnetometer 36 is connected to the microcontroller 30 by a first interface 46 providing a communications interface. The accelerometer 34 correspondingly includes a communications interface 38, and the thermometer 37 correspondingly includes a communications interface 391. As an example, the transceiver 26 may be a THVD1410 RS-485 transceiver manufactured by Texas Instruments and suitable for communicating via an RS-485 bus. (As will be appreciated therefore, the common bus 24 operates in accordance with a predetermined standard for transmitting and receiving signals between devices (for example, the EIA-485 standard). As also shown, the control circuit 30 is connected directly to first interface 20 via the first channel 48 (input) and to second interface 22 via the second channel 49 (output). Other ancillary elements as shown in FIG. 3, a power bus 25 between first interface and second interface 22, and a power management circuit 56 of the electrical circuit 28. The power management circuit 56 is connect to a power links 52, for providing power to each of the devices requiring power, which are at least the microcontroller 30, the accelerometer 34, the magnetometer 36, and the thermometer 37. Furthermore, a bootloader may be used to update the firmware of each module over the communication bus if desired/necessary.

Figure 4:
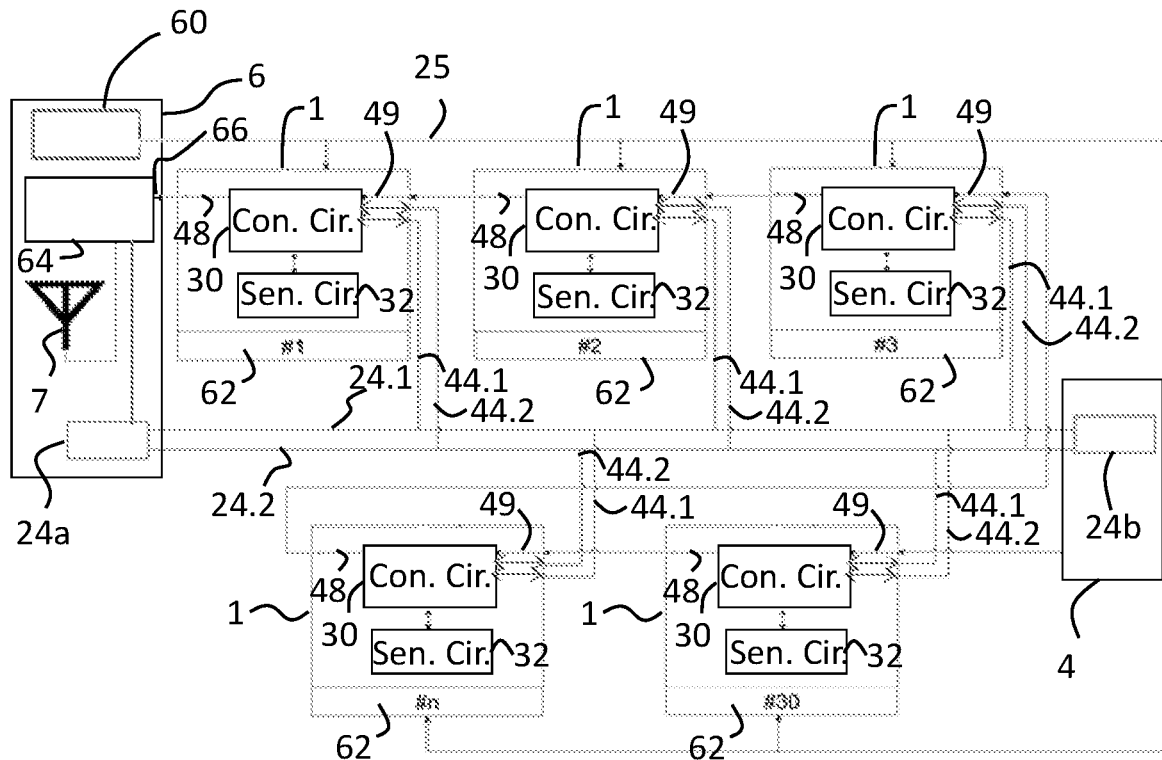
FIG. 4 is a schematic diagram of electrical components of a chain of the sensing elements of FIGS. 2 and 3.

A more detailed diagram of the electronic components of the system shown in FIG. 1, with the corresponding elements show in FIGS. 2 and 3, is shown in FIG. 4. As shown in FIG. 4, five sensing elements are disclosed. The electrical circuits 28 of each of the sensing elements are shown with their respective microcontrollers 30 and the sensor circuits 32, including the accelerometer 34, magnetometer 36 and thermometer 37. Also shown in FIG. 4 is the control element 6. The control element 6 is configured to connect to the communication bus directly and may also provide any required electrical termination for the bus. For example, the control element 6 may include a resistor which connects the two lines of the communication bus, such that it passively returns the voltage between the two lines to 0 V.

A shared battery 60 may be provided within the control element 6. In other examples, not shown, the shared battery may be provided in a separate accessible location such as a container.). The shared battery 60 provides power through the power bus 25 to each of the electrical circuits 30 of the sensing elements via the interfaces 20, 22 and power circuitry 56. Low power requirements of the sensing elements allow for repeated measurements over an extended period of time. For example, a battery life of around 10 years can be expected for a single battery powering an array of sensing elements and a control element with an hourly reporting rate. This can be achieved by employing an aggressive duty cycle which reduces "on" time of each sensing element and control element to a few percent of the lifetime. The sensor devices and the control circuitry 30 may effectively be disabled when the sensing element is in an "off" state. For example, a device may be "on" for between 1% and 5% of every hour, to facilitate measurements and transmission of the measurements, by using algorithms to synchronise communications and avoid unnecessary power usage spent "listening". In some examples the control element and/or the shared battery may be electrically connected to an external power supply such as a "mains" power supply.

As shown in FIG. 4, the control element 6 may comprise circuitry 64 for controlling operation of the control element 6. The control circuitry 64 may, for example, include transceiver circuitry for communicating wirelessly via an antenna 7. The control element 6 is configured to provide the common bus terminator 24a as well as to terminate the channel 48 of the first sensing element in the chain. The control circuitry 64 is configured to be operable to communicate via the common bus 24 with the plurality of sensing elements 1. The control circuitry 64 is further configured to be operable to communicate with the first sensing element in the chain via channel 48. For example, the control circuitry may be configured to receive signals sent from the first sensing element via channel 48. The control circuitry 64 may be electrically connected with channel 48 via channel 66.

In examples, the control circuitry 30 and or the power management circuitry 50 of each sensing element may include an electrical energy store 50 for storing energy received from the battery 60 (via power bus 25). The activities of the sensing element may depend on the current voltage state of the energy store 50. The control circuitry 30 may be configured to measure or otherwise determine the charge state of the energy store 50, and in response to determining that the charge state is below a threshold value (for example, a threshold value stored in a memory of the control circuitry), the control circuitry 30 may delay messaging using the common bus 24 until the charge state (i.e. charge stored) is sufficiently high. The control circuitry may delay messaging by preventing the supply of power to the transceiver (i.e. the transceiver may not be powered on). This is advantageous as it allows charge to be stored even when the sensing element is distant from the power source (e.g. 100 m away and separated by a large number of other sensing elements). This prevents the control circuitry 30 from sending only a portion of a message before running out of power.

It will be appreciated that restricting the duty cycle based on the charge state of the energy store 50 may limit the maximum frequency at which measurements may be taken and transmitted. However, for measurements taken over a suitably long timescale (for example, the period between measurements may be tens of minutes or hours), late reporting of some measurements is considered an acceptable compromise, if total energy consumption and therefore maintenance requirements (i.e. replacement of a battery) can be reduced. Furthermore, it will be appreciated that the control circuitry may be configured to permit the supply of power to the sensor circuitry even if the charge state of the energy store is below a threshold value. In some examples, the charge state of the energy store 50 may be determined or inferred based on a measurement of a voltage of across the energy store. In other examples, other measurements may be used. In examples, the electrical energy store 50 may be provided by a capacitor or a battery.

In some other examples, each of the sensing elements 1 may include an electrical energy store 50 (for example, a battery) having a capacity sufficient to provide power to each of the devices requiring power, which are at least the control circuit 30, the transceiver circuitry 26, the accelerometer 34, the magnetometer 36, and the thermometer 37, for a prolonged period of time (for example, 4 years). In some of these other examples, each sensing element may not incorporate a power bus 25 such that power may not be provided through common interfaces 20, 22.

As shown electrically in FIG. 4 the common bus 24 comprises a pair of parallel conductors 24.1, 24.2 which are each terminated by first and second communication bus terminators 24a, 24b. The terminating element 4 is configured to provide the communication bus terminator 24b as well as to terminate the channel 49 of the final sensing element in the chain. As illustrated in FIG. 4 although there are five sensing elements 1 shown; however there could be, for example, thirty sensing elements in the chain.

Figure 5:
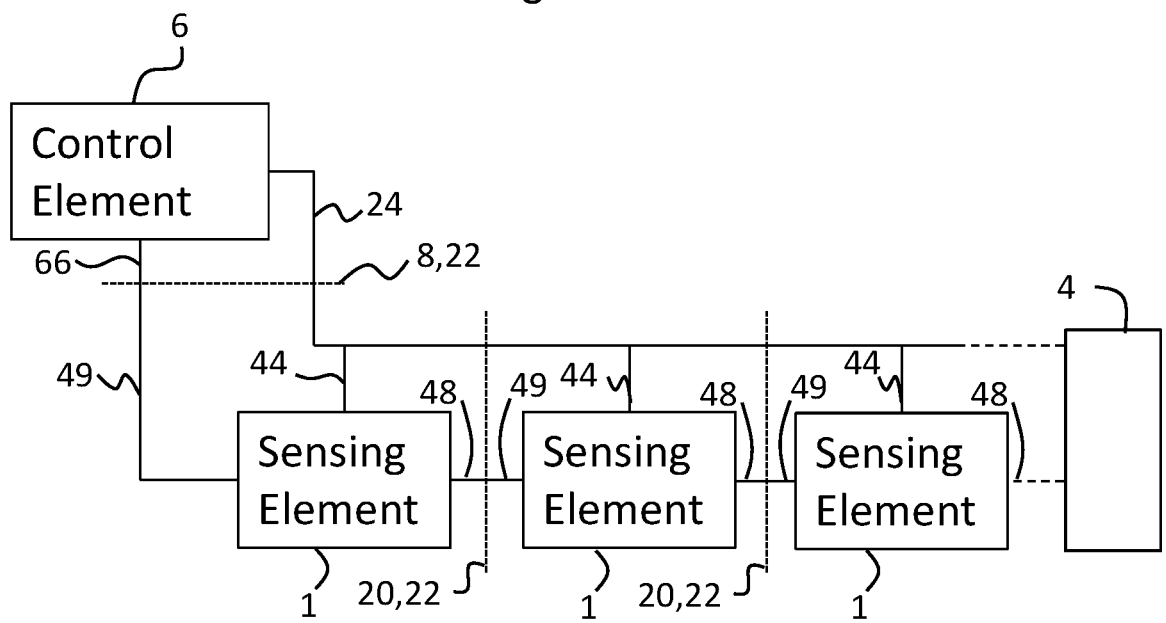
FIG. 5 is a simplified diagram of a communication network of the chain of sensing elements of FIG. 4.

A simplified diagram of the communication network of the system shown in FIG. 4 is shown in FIG. 5. As shown in FIG. 5, three sensing elements and a control element 6 are disclosed, however it is indicated by dashed lines that the network could include further sensing elements. The sensing elements connect to their neighbouring elements via connecting interfaces 20, 22. The three sensing elements 1 and the control element 6 are all connected via the same common communications bus 24. As stated above, sensing elements include transceiver circuitry 26 to facilitate the connection to the common bus 24 via an interface 44. Each sensing element is also connected to its neighbouring elements by channel 48, 49. An interface 8 may electronically connect between an interface of the first sensing element and the control element 6. Interface 8 is configured to provide electrical connection with common bus 24 and either channel 48 or 49. It will be appreciated that while FIG. 5 depicts the transmission of data towards the first sensing element (upstream), in other examples data may be transmitted away from the first sensing element (downstream), for example by configuring the control circuitry such that the address in and address out are effectively switched, or may be transmitted in both directions (e.g. for increased robustness).

The system may utilise various addressing algorithms to determine the position of each sensing element. In general each sensing element will expose one connection to an adjacent sensing elements via the interface 20, 22—one for input (channel 48) and one for output (channel 49)—for relative position identification in the chain in relation to the neighbouring sensing elements.

Figure 6:
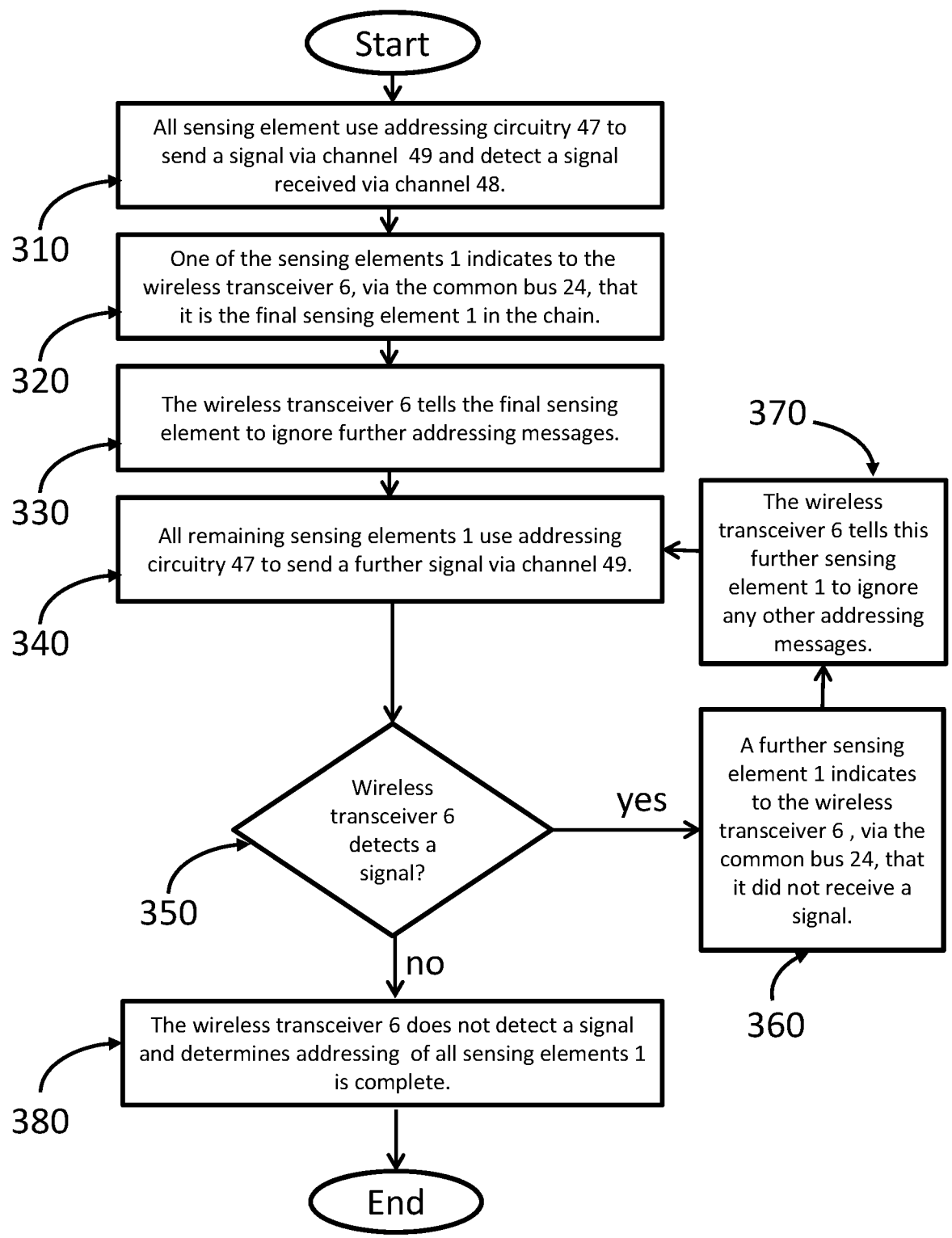
FIG. 6 is a flow diagram of a first addressing algorithm in accordance with some example embodiments of the invention.

FIG. 6 is a flow diagram of a first example addressing algorithm in accordance with some example embodiments of the invention. To start the addressing algorithm, the control element 6 (or master communication bus device) may communicate a command to each sensing element over the communication bus 24 to initiate the identification process. Each sensing element may be assigned a serial number during production programming (for example, a 24 bit serial number). This serial number is unique to a single sensing element. This serial number is used as the default identification mechanism for communication over the common bus and, as such, may be used in communications between the sensing elements and the control element to identify specific transmissions to or from the sensing element. Each sensing element may, for example, communicate their large ID (i.e. a 24 bit serial number) to the control element upon activation (as part of a starting routine), at the beginning of an addressing algorithm, at the end of the addressing algorithm, or during the addressing algorithm. The control element 6 may create a list in memory of the large IDs of each of the sensing elements connected in the chain. In some examples the length of particular sensing elements, or another configurational aspect of the sensing element, may be indicated by the certain bits of the large ID. For example, 2 bits of the 24 bits may be used to indicate one of four lengths: 0.5 m, 1 m, 2 m or 3 m.

A small ID may be for example a 6 bit number assigned to each unit from the common bus master (i.e. the control element). This small ID can then be used to communicate with each connected segment using shorter messages. In some examples, the small ID may be assigned after the order of the chain has been determined. The small ID may provide an indication of the position of each of the sensing elements within the chain (i.e. they may numerically increase or decrease in value when traversing the chain from the control element to the terminating element). Each of these identifications can then be interpreted as a number of the sensing element in the chain as illustrated in boxes 62 of FIG. 4, which for the example shown are numbered 1, 2, 3, N, 30.

In other examples, the control element 6 may receive a large ID from each sensing element connected to the common bus 24 and may assign a small ID to each of the sensing elements independently of their position in the chain of sensing elements. For example, small IDs may be assigned on a first to respond basis or on the sequential ordering of the large IDs.

The example addressing algorithm shown in FIG. 6 is as follows:

Step 310: All sensing elements 1 use addressing circuitry 47 to send a signal via channel 49 and detect the presence or absence of a signal received from channel 48. For each sensing element, a signal sent via channel 49 of a first sensing element 1 is received by second sensing element 1 via channel 48 as the first and second sensing elements are directly connected by interfaces 22 and 20, respectively (except for the first sensing element in the chain for which a signal sent via channel 49 may be received or detected by the control element 6 directly). In some examples, each sensing element 1 may conserve energy by only enabling (i.e. switching on) addressing circuitry 47 to send and/or receive signals from channels 48,49 when instructed by the control element (i.e. in response to the initiation of an addressing algorithm). The signal sent may be a voltage signal, e.g. of a particular voltage value or above a threshold voltage value. The voltage signal may be, for example, referenced to a common ground associated with the power supply.

Step 320: One of the sensing elements 1 indicates to the control element 6, via the common bus 24, that it is the final sensing element. The final sensing element identifies itself by determining that it did not detect a signal from an adjacent sensing element (the signal generated in step 310). This is indicative of the final sensing element being neighboured with the terminating element 4. As an example, sensing elements may be configured to determine is a signal value falls within an expected range. If any signal (e.g. of a voltage) is detected with a value outside of this range, then the sensing element will indicate that it is the terminal element.

Step 330: The control element 6 tells the final sensing element to ignore further addressing messages. If at this point the final sensing element is still transmitting a signal via channel 49, the final sensing element ceases to transmit a signal via channel 49 and disables (i.e. switches off corresponding functionality of the control circuit) detection of signals by channel 48, if necessary.

The control element 6 may also assign this sensing element small ID 1. The control element 6 may assign and store the assignment of the small ID in a memory associated with the control element 6. The memory may associate or link the small ID with the large ID which is unique to the final sensing element. The control element 6 may send the assigned small ID over to the final sensing element, via the common bus. The small ID may now be used for any future communications.

Step 340: All remaining sensing elements 1 send a further signal via channel 49. The further signal may be sent after a predetermined time or may be sent in response to an instruction from the control element 6 after a set period. By remaining sensing elements it is meant sensing elements which have not been instructed to ignore further addressing messages.

Step 350: The control element 6 determines whether it detects a further signal from the sensing element 1 to which its channel 48 is connected. If it does, the algorithm proceeds to step 360. If it does not, the algorithm proceeds to step 380.

Step 360: A further sensing element indicates to the control element, via the common bus, that it did not receive a signal. This is indicative of the sensing element being next in line in the chain.

Step 370: The control element 6 tells this further sensing element to ignore any further addressing messages. If at this point the further sensing element 1 is still transmitting a signal via channel 49, the further sensing element 1 ceases to transmit a signal via channel 49 and disables (i.e. switches off corresponding functionality of the control circuit) detection of signals by channel 48. The control element 6 may assign this sensing element the next small ID (i.e. by incrementing the small ID value by one from the last value assigned). The control element 6 may send the assigned small ID over to the further sensing element, via the common bus 24. The small ID may now be used for any future communications. The algorithm returns to step 340.

Step 380: The control element 6 does not detect a signal and determines addressing of all sensing elements 1 is complete. The control element 6 determines the order of the chain based on the order in which the sensing elements reported they were no longer receiving signals.

It will be appreciated that the control element 6 may also be able to determine the number of sensing elements 1 expected in the chain based on the number of sensing elements 1 with which it communicates over the common bus 24. The control element 6 may alternatively, count the number of sensing elements 1 which indicate that they have not received a signal and stop when all sensing elements 1 are accounted for. Furthermore, in some examples control element 6 may not be configured to receive signals sent from an adjacent sensing element via channel 49. In these examples the control element may end the addressing algorithm based on the number of sensing elements which have reported that have not received a signal, or when no sensing elements report whether they have or have not received a signal (i.e. all sensing elements have been instructed to ignore further addressing messages).

A user of the system may be able to communicate with the control element 6 (either directly or, for example, via remote server 12) to obtain the ordering of sensing elements. The user may be able to compare the ordering with an expected ordering to determine whether the sensing elements have been ordered correctly. For example, the user may be able to determine if sensing elements of particular lengths have been positioned correctly in the structure or environment.

Figure 7:
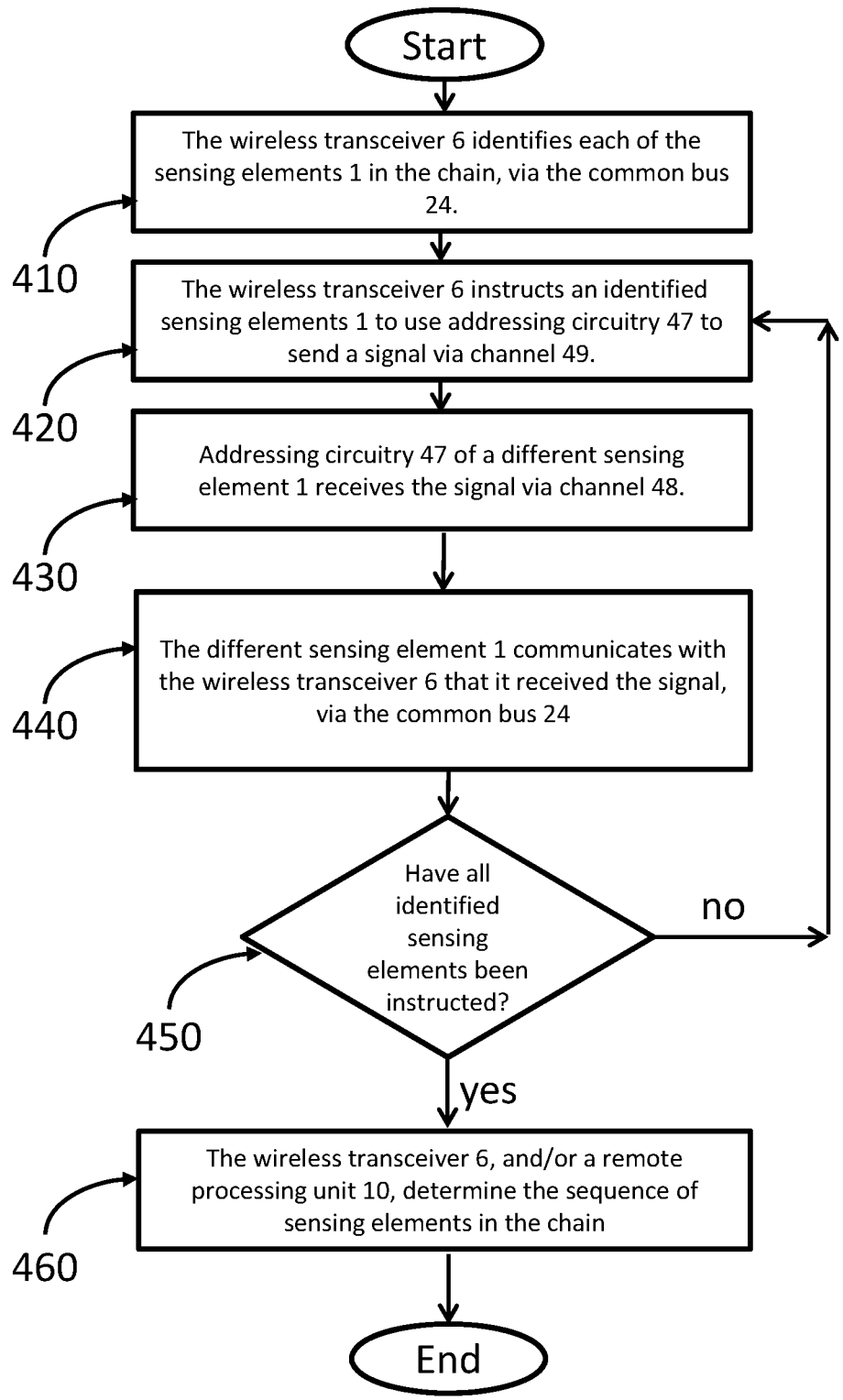
FIG. 7 is a flow diagram of a first addressing algorithm in accordance with some example embodiments of the invention.

FIG. 7 is a flow diagram of a second example addressing algorithm in accordance with some example embodiments of the invention. To start the addressing algorithm, the control element 6 (or master communication bus device) may communicate a command to each sensing element over the common bus 24 to initiate the identification process.

Step 410: The control element 6 identifies each of the sensing elements 1 in the chain, via the common bus 24. The control element may in some examples, already have this information. For example, each sensing element may provide its large ID as part of an activation or start up procedure.

Step 420: The control element 6 selects an identified sensing element 1 (i.e. one of the sensing elements from the list of identified sensing elements) and instructs it to use addressing circuitry 47 to send a signal via channel 49 (alternatively channel 48). The control element 6 may instruct any of the identified sensing elements. The selection and instruction is independent of the sensing element's location in the chain of sensing elements 1.

Step 430: Addressing circuity 47 of a different sensing element 1 of the chain of sensing elements receives the signal via channel 48 (or channel 49 if the signal is sent via channel 48). The different sensing element 1 is the sensing element 1 which is adjacent (e.g. directly upstream) in the chain to the instructed sensing element 1. It will be appreciated that in some examples, one of the sensing elements may transmit a signal via channel 49 directly to the control element 6. In these examples the method will skip step 440 and proceed directly to step 450.

Step 440: The different sensing element 1 communicates with the control element 6 that it received the signal, via the common bus 24. The control element 6 stores which different sensing element communicates receipt of the signal.

Step 450: The control element determines whether all identified sensing elements have been instructed to communicate via channel 49. If all identified sensing elements have been instructed to communicate via channel 49, the method proceeds to step 460. If any identified sensing elements have not been instructed to communicate via channel 49, the control element 6 returns to step 420 and instructs a previously uninstructed sensing element 1 of the chain of sensing elements 1 (based on a list of IDs which have been provided). The control element 6 may store which sensing elements have previously been instructed.

Step 460: The control element 6, and/or a remote processing unit 10, determine the sequence of sensing elements 1 in the chain. The determination is based on which sensing element received which a signal from which other sensing element. In other words, the determination is made based on each sensing element identifying one neighbour (i.e. the downstream neighbour connected to channel 48). Once the determination is complete, the method ends.

It will be appreciated that in an alternate method each sensing element 1 of the chain of sensing elements may transmit in the opposite direction instead (i.e. transmitting via channel 48 and receiving via channel 49). In some examples, the method can be repeated with each sensing element 1 of the chain of sensing elements transmitting in the both directions. This may improve the robustness of the determination.

Figure 8:
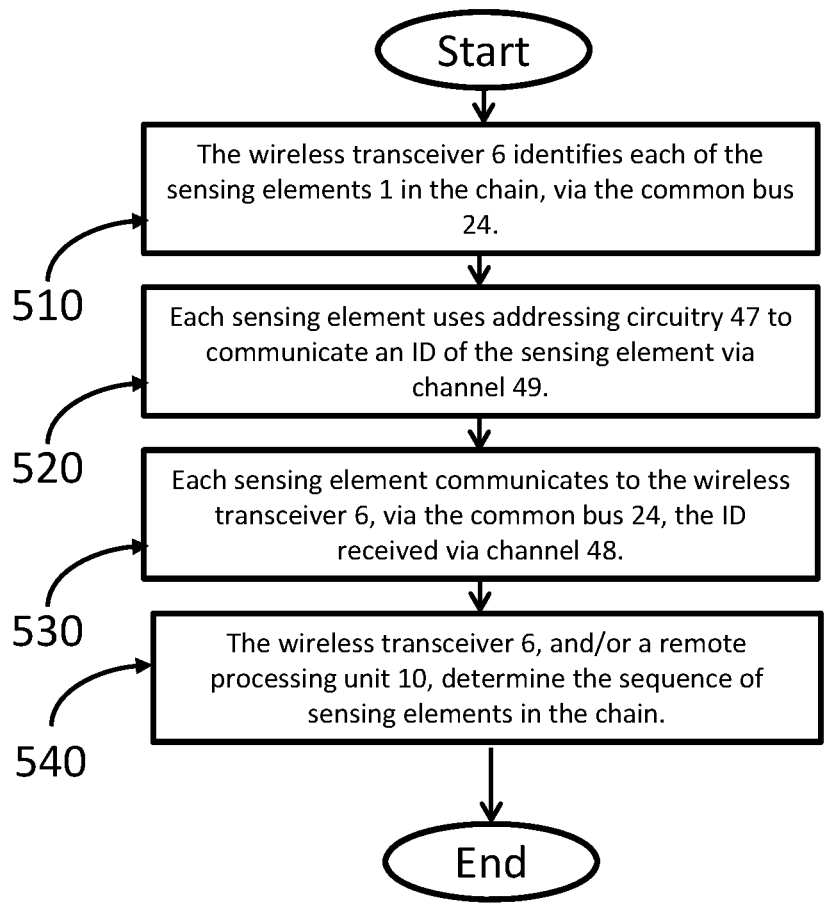
FIG. 8 is a flow diagram of a first addressing algorithm in accordance with some example embodiments of the invention.

FIG. 8 is a flow diagram of a third example addressing algorithm in accordance with some example embodiments of the invention.

Step 510: The control element 6 (or master communication bus device) may communicate to all sensing elements connected via the common bus 24 a command to initiate the identification process. The control element 6 may or may not be aware of the number of sensing elements to which it is connected via the common bus 24.

Step 520: Each sensing element 1 uses addressing circuitry 47 to communicate an ID of the sensing element via channel 49. The ID may be the long ID (i.e. 24 bit ID) unless the sensing element has been assigned a small ID (for example as part of a start up routine).

Step 530: Each sensing element 1 communicates to the control element 6, via the common bus 24, the ID received via channel 48. The addressing circuitry 47 being used to receive the ID via channel 48. For example, each sensing element 1 may communicate to the control element 6 their own ID and the ID received. Additionally, the control element 6 may also receive the ID of one sensing element which transmitted their ID directly to the control element 6 via channel 49. It will further be appreciated that the final sensing element (furthest from control element 6) will not receive an ID. In some examples, sensing elements may wait a pre-determined period of time to receive a signal, and if they do not receive a signal in that period of time, they may communicate to the control element 6, via the common bus 24, that they did not receive an ID via addressing circuit 48. It will be appreciated that if more than one sensing element communicates that they did not receive a signal, this may indicate a fault in one or more of the sensing elements (i.e. a faulty connection).

Step 540: The control element 6, and/or a remote processing unit 10, determine the sequence of sensing elements. The determination is based on which sensing element received which particular ID.

While the example algorithms transmit data upstream via channels 48 and 49, it will be appreciated that the example algorithms could be modified to transmit data downstream instead. In some examples, the addressing algorithms may first transmit data upstream before repeating in a modified fashion to transmit data downstream. Such examples may provide for a robust identification process.

Physical Characteristics

Figure 9:
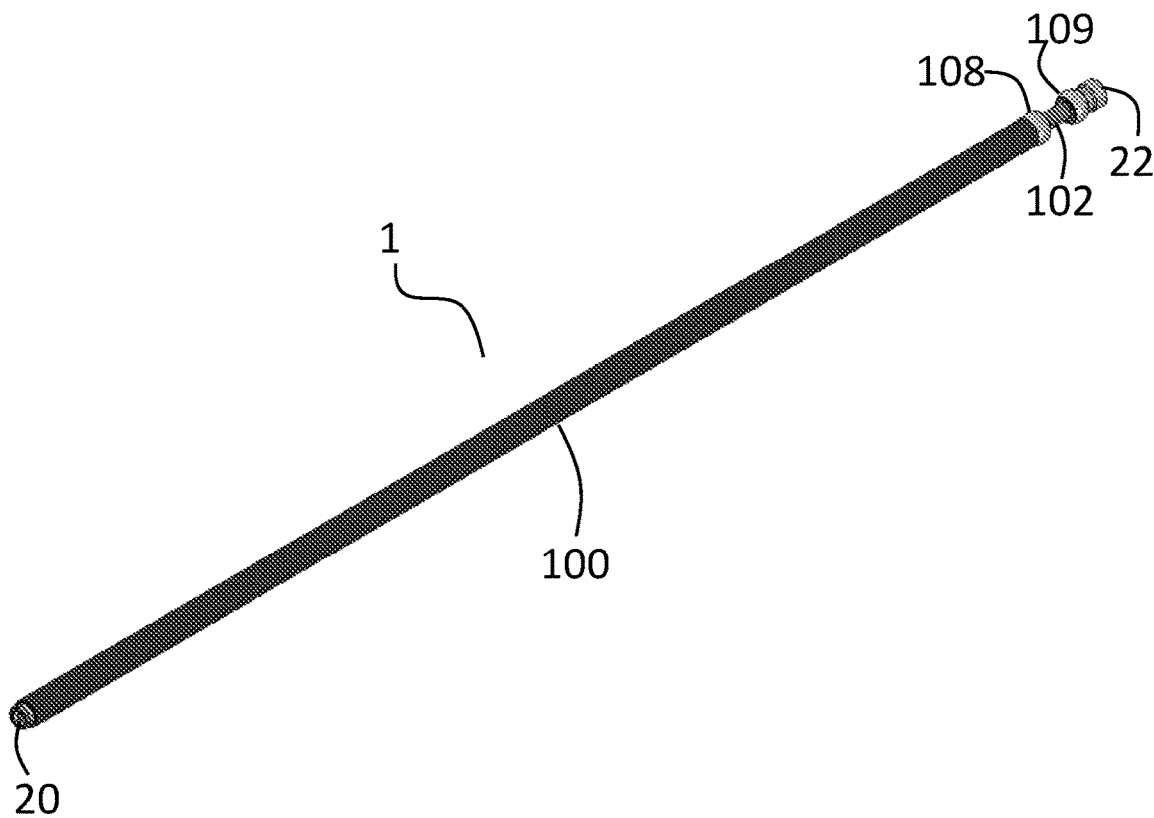
FIG. 9 is a representation of a sensing element in accordance with an example embodiment.

The present technique also provides physical attributes of the sensing elements 1 which facilitate deployment of the sensing elements within the structure which is being monitored. An example of a sensing element is shown in FIG. 9. FIG. 9 provides an example illustration of a physical construction of a sensing element. The sensing element is shown with an elongated body 100 (formed from carbon fibre for example) and includes corresponding male and female connectors (for example, a screw-threaded adaptor) at either end, forming the interfaces 20, 22. As an example, (marine grade) stainless steel may be used as a material for the male and female connectors. Stainless steel will provide sufficient mechanical strength to support the weight of the chain and will allow for long term deployment in outdoor and submerged situations with minimal corrosion.

The second interface 22 is connected to the elongate body 100 via a flexible umbilical connector 102 which allows the sensing element to move freely as a component of the chain within the structure being monitored. For example, this allows the sensing element to move as the chain is positioned within the structure (e.g. borehole 2) and also allows for later movement due to deformation or other changes of the structure. The body 100 may be constructed from a light-weight rigid material (e.g. carbon fibre, fibre glass, carbon fibre, poly-para-phenylene terephthalamide or similar). The flexible umbilical connector 102 may be formed from reinforced silicone rubber, for example. The flexible umbilical connector 102 allows for a wide range of movement (90° in all directions), including twist, but it should resist elongation.

Each end of the flexible umbilical connector 102 is surrounded by a bearing 108, 109. The bearings 108,109 may be spherical bearings (i.e. configured to allow angular movement). The bearings 108, 109 have a diameter larger than that of the body 100 such that the bearings 108, 109 are in contact with any adjacent wall (i.e. a wall of a borehole) rather than the body 100. The bearings 108, 109 may be made of stainless steel or a high grade polymer and may be formed as an integrated component with the connectors or may be attached as a separate component to the connectors. As shown in FIG. 9, the bearings 108,109 are preferably provided close together adjacent to a point where movement is permitted (i.e. adjacent the flexible umbilical connector) as a space between the bearings 108,109 forms an unmonitored section in the chain and any movement in this area cannot be measured or measurement is difficult and less accurate. The sensing element may be configured to have a maximum distance of separation between the bearings 108, 109 of less than 10 cm, preferably less than 7 cm and, and in some examples less than 5 cm. In some examples the sensing element may be configured to have a maximum distance of separation between the bearing 108,109 of 4 cm.

As will be appreciated, the physical construction of the housing of the sensing element 1 may be adapted dependent on the structure being monitored. Different sensing elements may have different lengths. For example, sensing elements may be manufactured in lengths of 0.5 m, 1 m, 2 m, and 3 m. The example shown in FIG. 9 is applicable for monitoring movement of, for example, a borehole, foundations, or a structure. Accordingly it would be appreciated that in other embodiments the housing may have a different shape or configuration in accordance with the particular application being monitored.

Figure 10:
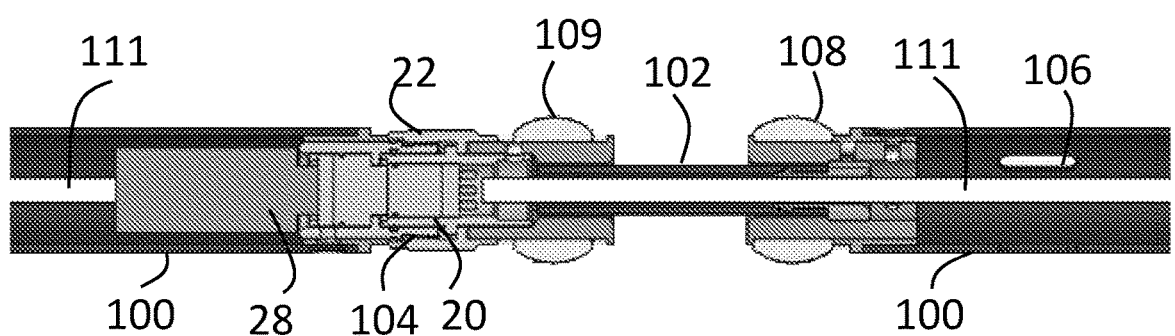
FIG. 10 is a representation of an example configuration of connectors on two sensing elements including respective interfaces which are arranged to provide both a physical and an electrical connection of the sending elements according to an example embodiment of the present technique.

A more detailed diagram of the connection of one sensing element to another via the first and second interfaces 20, 22 is shown in FIG. 10. As shown in FIG. 10, two sensing elements 1 are connected together via the first and second interfaces 20, 22. The first and second interfaces provide a male and female male connection which connects via a threaded screw 104. The umbilical element 102 provides provision for electrical signals of the common bus 24 to be connected from one sensing element to the other, whilst also allowing for changes in relative orientation of the two sensing elements 1.

Also shown in FIG. 10 is a vent 106 formed in the elongated housing 100 which allows air to escape from the housing which is substantially hollow or at least part thereof is hollow. Accordingly when the sensing element is immersed in a structure which includes fluid, such as water, the air can be displaced from the hollow section of the sensing element so that the sensing elements are substantially neutrally buoyant. In other words, by flooding the hollow section, the chain is prevented from floating in the liquid due to the presence of trapped air which may cause sensing elements to have a weight density lower than that of the surrounding water. As will be appreciated, movement due to a sensing element floating would create anomalous sensor measurements. Use of a hollow housing minimises the total weight of the sensors, aiding installation.

The electronic circuit 28 of each sensing elements is provided in an enclosure separate from the hollow portion of the housing 100, to prevent damage to the electronic circuit due to the extreme conditions. As an example, the electronic enclosure needs to be able to survive very high pressure underwater conditions (>10 bar) for long periods of time. In some examples, the electronic circuit 28 within the housing 100 may be potted to separate the electronic circuit 28 from the hollow portion and also to remove air cavities. Furthermore, in some examples a first softer potting agent may be provided in contact with the electronic circuit, and a second harder potting agent may be provided surrounding the first potting agent. Such examples may allow sensitive electronic components to be protected from the external water pressure whilst also allowing the device to be used at significant pressures (e.g. pressure due to depths of 200 m in water). An advantage of using potting compounds is that they result in a single part seal, with no reliance on joints or gaskets.

In other examples, the electronic circuit may be provided in a pressure chamber (for examples, a stainless steel pressure chamber). Empty space within such a pressure chamber may be reduced by use of a filler material. An advantage of using a pressure chamber is that a sensing assembly can be disassembled, separating the electronics circuit 28 from the rest of the housing, allowing repairs, replacements or upgrades to the hardware components.

Each sensing element includes wiring for the supply of power 50, the common bus 24 and the channels 48,49.

Potentially sensing elements may be exposed to high pressure water (for example, up to 200 m water depth). To minimise the risk of cable damage leading to water wicking into the enclosure of the electronic circuit 28, jelly filled cables 111 may be used within the body 100 and flexible umbilical connector 102.

Chain Installation

More detailed diagrams of the first and second interfaces are shown in FIGS. 11*a*, 11*b*, 11*c*. FIG. 11*a* corresponds to the diagram shown in FIG. 10 with FIGS. 11*a*, 11*b* and 11*c* showing the respective male and female male connectors of the first and second interfaces 20,22. As shown in FIG. 11*b* the first interface 20 includes five pins 110 to provide electrical connection for the interface and the corresponding second interface 22 includes five sockets 112. Accordingly a secure connection between the sensing elements which provides both physical and electrical connection is provided. Furthermore, FIG. 11*b* shows five pins. While any order may be used for the pins 110, a first two of the pins 110.1, 110.2 may be used to facilitate power transmission, a second two of the pins 110.3, 110.4 may be used to facilitate the common bus, and the final of the pins 110.5 may be used to provide the interface between addressing circuits 48, 49 of two connected sensing elements. In some examples the control element 6 may be provided with an interface which is configured to form an electrical and physical connection to one of the interfaces of the sensing elements, for example the first interface 20. In other examples a dummy sensing element, or other adaptor, may be provided to act as an interface between the chain of sensing elements 1 and the control element 6.

FIGS. 11*a*, 11*b* and 11*c* depict a smooth bore pipe installation where a smooth bore pipe is used as the borehole casing. By smooth it is meant smooth in contrast to a standard IPI casing which includes longitudinally extending channels. A pipe 200 may be selected to have a diameter only slightly larger then the outside diameter of the bearings 108,109 of the sensing elements. A suitable pipe for the installation would be, for example, 1" Schedule 40 PVC (33.4 mm OD, 26.6 mm ID) but it will be appreciated that many other alternative sizes and materials could be used. A small diameter cable or cord 202 is used to provide a spring force retaining the sensing elements against the borehole casing. The diameter of the cord or cable 202 may be selected dependent on the difference in diameter of the pipe 200 and the diameter of the bearings 108, 109 of the sensing elements. This cord may be attached to the lowest segment in the chain before insertion, such that it compresses to fill the gap between the spherical bearings and the pipe side wall. This will also aid in the removal of the chain as the cord can be used to extract the sensing elements.

As there are no grooves in the casing of this method to restrict twist, a correction will need to be performed mathematically. This will be done using the magnetometer located in each segment and could be performed by the sensing element itself, the control element or the remote processing unit 10.

Figure 12A:
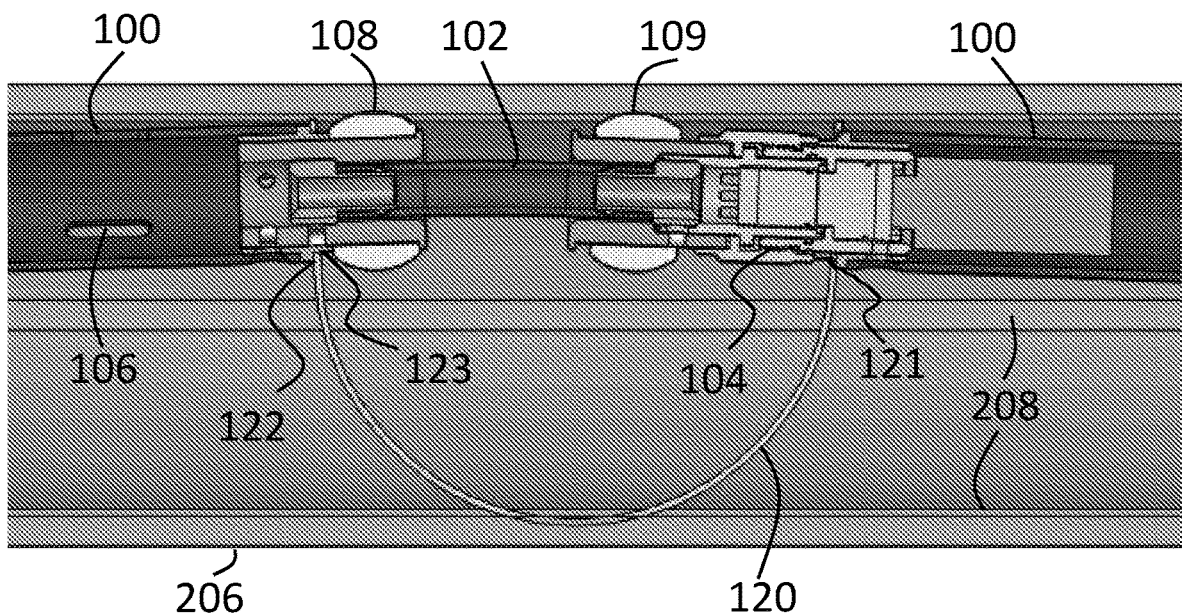
FIGS. 12A, 12B and 12C are representations of a chain of sensing elements illustrating a further example embodiment of the present technique.
Figure 12B:
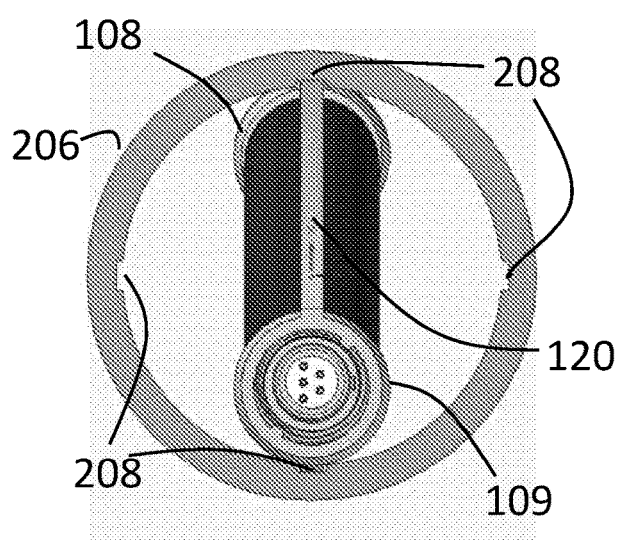
Figure 12C:
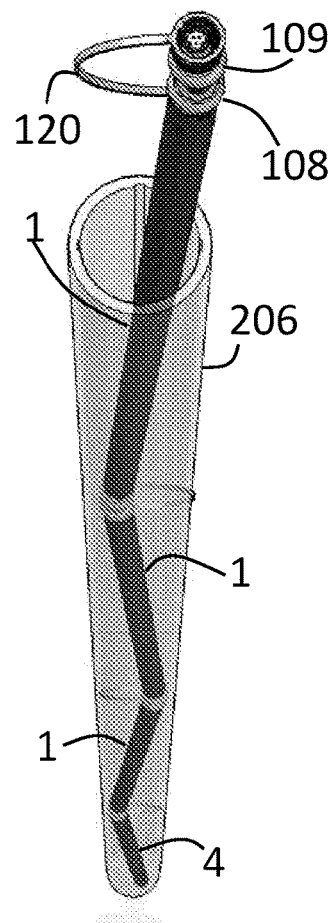

A further aspect of the present technique can be understood from FIGS. 12*a*, 12*b* and 12*c*. As shown in FIG. 12*a*, each of the sensing elements 1 is provided with an arcuate spring 120. The spring 120 may be provided adjacent to the flexible coupling 102. In other words, the spring may be connected or in contact with a part of the sensing element either side of the flexible coupling 102. In some examples, a first end 121 of the spring 120 may be retained in place by the connection of interfaces 20 and 22 of two sensing elements. The first end 121 and the second end 122 may be provided by attachment mechanisms which are configured to retain the arcuate spring in a position adjacent to the sensing element whilst also allowing a user to detach the spring 120 from the attachment mechanism if required.

For example, the first end 121 of the spring 120 may comprise a ring or hoop configured to fit over or be positioned adjacent (coaxially) to the a first part (male or female) of screw thread 104 of a first sensing element such that when a corresponding part (female or male) of screw thread 104 of a second sensing element is attached the ring part of the spring is held in place. In some examples, the second end 122 of the spring 120 may be attached to a sensing element 1 adjacent or close to bearing 109. For example the second end 122 of the spring 120 may be configured to clip on or otherwise engage with the sensing element 1.

In some examples, the sensing element 1 may comprise a retaining feature 123 for retaining the other end of the spring. For example, the second end 122 of the spring may comprise an open ring (for example, the second end may comprise an incomplete ring such as a half-ring shape). Tips or end points of the open ring may include a protrusion directed radially inwards from an inner circumference of the ring. The sensing element 1 may comprise a locking groove 123, which may include an indent. In use the second end 122 may attach to the locking groove 123. Furthermore, when the second end 122 is attached to the locking groove 123, the protrusion of the second end 122 may be inserted into the indent of the locking groove 123, thereby aiding retention of the second end 122. The locking groove acts as an attachment mechanism configured to retain the arcuate spring, whilst also allowing a user to detach the spring 120 from the attachment mechanism if required.

The arcuate spring 120 has a depth with respect to the axis of the sensing elements such that when the sensing elements are deployed, the spherical bearings 108,109 of the sensing elements are forced against a wall of the borehole by pressure of the arcuate spring 120 on an opposite wall of the borehole. As described above, in some examples the spring 120 may be reversibly attached such that it can be removed and replaced if the system is to be redeployed. For example, a spring of different dimensions may be used to suit different casings. Furthermore, removing the spring 120 may aid transportation.

Since the elongate housing 100 is of a substantially rigid material, the chain can be pushed into the borehole and retained in position by action of the arcuate spring 120. This forces the sensing elements to grip the borehole and aids in preventing the sensing elements from rising or sinking in relation to a change in environmental conditions (e.g. the borehole flooding or drying up). Furthermore the vent 106 allows air to be displaced from hollow sections of the sensing elements so that the sensing elements do not float which again allows the sensing elements to be positioned under their own weight within the borehole. It will be noted that the necessary force to be applied by the springs is reduced due to the ability of the body 100 of each sensor element to flood and the lightweight materials used which ensures that sensing elements do not shift significantly when environmental conditions change.

The sensing element 1 including arcuate spring 120 of FIGS. 12*a*, 12*b* and 12*c* depict installation of a chain of sensing elements in conventional IPI Casing 206. This style of casing features vertical grooves 208 designed for use with a conventional IPI measurement device. The grooves guide the wheels of a traditional IPI as it descends the borehole with the intention of minimising or eliminating twist between segments.

The arcuate springs 120 of the sensing elements 1 of the chain may also be guided by these grooves 208. For example, they may be designed to have a width that is less than these grooves as shown in FIG. 12B. The contact point between each sensing element and the casing 206 is the spherical bearings 108,109 and the arcuate spring 120. The spherical bearings 108, 109 and the arcuate spring 120 may act with the grooves 208 to guide the chain of sensing elements 1 and to reduce twisting of the sensing elements 1.

It will be appreciated that a smooth pipe (without grooves) could be used instead of the conventional IPI casing. As above, the arcuate spring 120 surrounding a joint would force spherical bearings 108, 109 against the opposing side of the borehole. As there are no grooves in the smooth pipe to restrict twist, a correction will need to be performed mathematically. This will be done using the magnetometer located in each segment and could be performed by the sensing element itself, the control element or the remote processing unit 10.

The chain of sensing elements 1 may be inserted into the borehole 2 in a zig-zag fashion, as shown in FIG. 12C. A zig-zag arrangement increases the distance between body 100 and the walls 206, which reduces the chance of contact between the body 100 and the walls 206. Contact with the walls could lead to damage of the body 100 and could also lead to an additional point of flex in the sensing element (bending the body 100) which could affect the accuracy of the measurements.

The following numbered clauses provide further example aspects and features of the present technique:

Clause 1. A sensor system comprising:
a plurality of sensing elements configured when deployed to be connected together to form a chain;
a control element configured when deployed to be connected to the plurality of sensing elements of the chain, and
each of the plurality of sensing elements comprises:
a housing,
first and second interfaces, each of the first and the second interfaces being configured to form an electrical and a physical connection to a corresponding interface of another of the plurality of sensing elements or the control element to form the chain;
electrical circuitry formed within the housing, the electrical circuitry comprising
at least one sensor configured to generate an indication of a relative orientation and tilt of the sensing element,
control circuitry configured to control communication of signals via one or both of the first interface and the second interface to at least one of the other sensing elements and/or the control element,
wherein the signals communicated via one or both of the first interface and the second interface to the at least one of the other sensing elements and/or the control element include an identification signal for identifying the sensing element and the indication representing the orientation and the tilt of each of the plurality of sensing elements in the chain.

Clause 2. A sensor system of clause 1, wherein the control element is configured to analyse the signals received from the first or the second interface of one of the sensing elements of the plurality of sensing elements of the chain to which the control element is connected, to identify an order of the plurality of sensing elements of the chain and/or to compensate for the orientation and tilt of each of the sensing elements of the chain in a deployed position.

Clause 3. A sensor system of clause 1 or 2, wherein the control element comprises a wireless transceiver;
wherein, the control element is configured to transmit wirelessly the signals received from the first or the second interface of the one of the plurality of sensing elements of the chain to which the control element is connected, to a remote analysis processor via the wireless transceiver, and
the remote analysis processor is configured to analyse the signals received from the control element to identify an order of the plurality of sensing elements of the chain and/or to compensate for the orientation and tilt of each of the sensing elements of the chain in a deployed position.

Clause 4. A sensor system of any of clauses 1 to 3, wherein the identification signal comprises an identification number of the sensing element.

Clause 5. A sensor system of any of clauses 1 to 4, wherein the control element is configured to identify the order of the plurality of sensing elements based on the control circuitry of each of the plurality of sensing elements communicating a respective identification signal of the respective sensing element to a first or second neighbouring sensing element of the plurality of sensing elements of the chain or to the control element via one of the first or the second interfaces.

Clause 6. A sensor system of any of clauses 1 to 5, wherein the electrical circuitry of each of the plurality of sensing elements comprises:
transceiver circuitry configured to communicate the signals via a communications bus formed between the first interface and the second interface, and
addressing circuitry configured to be operable to communicate the identification signal with one of the group consisting of a first neighbouring sensing element or a second neighbouring sensing element of the plurality of sensing elements of the chain to which the sensing element is connected via the first or the second interfaces, respectively, and the addressing circuitry configured to be operable to receive a second identification signal from one of the group consisting of a first neighbouring sensing element or a second neighbouring sensing element of the plurality of sensing elements of the chain to which the sensing element is connected via the first interface or the second interface, respectively.

Clause 7. A sensor system of clause 6, wherein, in response to receiving the different identification signal, the control circuit is configured to control the transceiver circuitry to communicate via the communications bus either the different identification signal or an acknowledgment that a different identification signal was received from one of the group consisting of the first neighbouring sensing element or the second neighbouring sensing element of the plurality of sensing elements of the chain.

Clause 8. A sensor system of clause 7, wherein the control element is configured to identify the order of the plurality of sensing elements based on communications from sensing elements of the plurality of sensing elements, via the communications bus, identifying at least one respective neighbouring sensing element.

Clause 9. A sensor system of any of clauses 6 to 8, wherein the first and second interfaces comprise:
a first set of one or more electrical contacts for facilitating communications via the communications bus, and
a second set of one or more electrical contacts for facilitating communications via the addressing circuitry;

wherein the one or more electrical contacts of the second set are different to those of the first set.

Clause 10. A sensor system of any of clauses 1 to 9, wherein the electrical circuitry comprises an electrical energy store and wherein the control circuitry is configured to determine a charge state of the electrical energy store, and wherein the control circuitry is configured to determine whether the charge state exceeds a threshold and to prevent activation of transceiver circuitry if the charge state of the electrical energy store does not exceed the threshold.

Clause 11. A sensor system of clause 10, wherein the electrical energy store is a capacitor.

Clause 12. A sensor system of any of clauses 1 to 11, wherein the sensor system comprises a terminating segment configured, when deployed, to be connected to a final sensing element of the plurality of sensing elements of the chain via one of the first or the second interfaces of the final sensing element.

Clause 13. A sensor system of any of clauses 1 to 12, wherein the sensor system comprises a second terminating segment configured, when deployed, to be connected to an initial sensing element of the plurality of sensing elements of the chain via one of the first or the second interfaces of the initial sensing element; or wherein the control element comprises a second terminating segment configured, when deployed, to be connected to a initial sensing element of the plurality of sensing elements of the chain via one of the first or the second interfaces of the initial sensing element.

Clause 14. A sensor system of any of clauses 1 to 13, wherein the at least one sensor configured to generate an indication of a relative orientation and tilt of the sensing elements comprises an accelerometer and a magnetometer, wherein optionally the accelerometer is a tri-axial accelerometer.

Clause 15. A sensor system of any of clauses 1 to 14, wherein the electrical circuitry of each of the plurality of sensing elements comprises at least one selected from the group comprising:
a thermometer;
a pressure sensor;
a vibration sensor; and
a gyroscope.

Clause 16. A sensor system of any of clauses 1 to 15, wherein the housing of each of the sensing elements includes a hollow section and one or more vents to allow fluid to displace air present in the hollow section when being deployed.

Clause 17. A sensor system of any of clauses 1 to 16, wherein each of the sensing elements includes a flexible coupling for connecting the first interface of the sensing element to a second interface on another of the sensing elements in the chain.

Clause 18. A sensor system of any of clauses 1 to 17, wherein each sensing element comprises an arcuate spring, the arcuate spring providing a biasing force with respect to a side of the housing of the sensing element and a surface of a structure in which the sensing element is deployed.

Clause 19. A sensor system of clause 18, wherein the arcuate spring is reversibly attached to the sensing element via an attachment mechanism configured to both retain the arcuate spring and to facilitate detachment of the arcuate spring.

Clause 20. A sensor system of clause 18 or 19, wherein the arcuate spring has a first end and a second end, wherein the first end is connected to the sensing element and the second end is engaged by the connection of the first interface of the sensing element to the second interface on another of the sensing elements in the chain.

Clause 21. A sensor system of any of clauses 18 to 20, wherein the arcuate spring is attached to the sensing element adjacent to the flexible coupling.

Clause 22. A sensor system of any of clauses 1 to 21, wherein the housing has a majority portion formed from one of the group comprising carbon fibre, fibreglass, and poly-para-phenylene terephthalamide, Clause 23. A sensor system of any of clauses 1 to 22, wherein the housing is an elongated tubular housing.

Clause 24. A sensor system of clause 23, wherein the housing has a length in an elongated direction of between 0.5 m and 3 m.

Clause 25. A sensing element comprising:
a housing,
first and second interfaces at either of two ends of the housing, each of the first and the second interfaces being configured to form an electrical and a physical connection to a corresponding interface of another of the plurality of sensing elements ora control element;
electrical circuitry formed within the housing comprising:
at least one sensor configured to generate signals representing a relative orientation and tilt of the sensing element,
control circuitry configured to facilitate communications via one or both of the first interface and the second interface to at least one of the other sensing elements and/or the control element to which the sensing element is connected.

Clause 26. The sensing element of clause 25, wherein the electrical circuitry of each of the plurality of sensing elements comprises:
transceiver circuitry configured to communicate the signals via a communications bus formed between the first interface and the second interface, and
addressing circuitry configured to be operable to communicate the identification signal with one of the group consisting of a first neighbouring sensing element or a second neighbouring sensing element of the plurality of sensing elements of the chain to which the sensing element is connected via the first or the second interfaces, respectively, and the addressing circuitry configured to be operable to receive a second identification signal from one of the group consisting of a a first neighbouring sensing element or a second neighbouring sensing element of the plurality of sensing elements of the chain to which the sensing element is connected via the first interface or the second interface, respectively.

Clause 27. The sensing element of clause 26, wherein the first and second interfaces comprise:
a first set of one or more electrical contacts for facilitating communications via the communications bus, and
a second set of one or more electrical contacts for facilitating communications via the addressing circuitry;
wherein the one or more electrical contacts of the second set are different to those of the first set.

Clause 28. A sensing element comprising:
housing means including a hollow section, the hollow section comprising one or more vents for allowing air to be displaced from the interior of the hollow rigid body in the presence of water;
first and second interfaces at either of two ends of the housing, each of the first and the second interfaces being configured to form an electrical and a physical connection to a corresponding interface of a different sensing element;

electrical circuitry formed within the housing comprising
at least one sensor configured to generate signals representing a relative orientation and tilt of the sensing element
communication circuitry configured to transmit generated signals from the sensor via the first or second interface.

Clause 29. A sensor system of any of clauses 1 to 24, the sensor system comprising:
a plurality of sensing elements, each sensing element comprising means for connecting to two other sensing elements of the plurality of sensing elements, the plurality of sensing elements to be connected together to form a chain when deployed;
a control element comprising means for connecting to the plurality of sensing elements of the chain, the control element connected to the plurality of sensing elements of the chain when deployed;
wherein each of the plurality of sensing elements comprises:
a housing,
means for forming an electrical and a physical connection to another of the plurality of sensing elements or the control element to form the chain;
electrical circuitry formed within the housing, the electrical circuitry comprising
at least one means for sensing an indication of a relative orientation and tilt of the sensing element, and
means for communicating signals to at least one of the other sensing elements and/or the control element;
wherein signals communicated via the means for forming an electrical and a physical connection to the at least one of the other sensing elements and/or the control element include an identification signal for identifying the sensing element and the indication representing the orientation and the tilt of each of the plurality of sensing elements in the chain.

Clause 30. A method of installing the sensor system of clauses 1 to 24, the method comprising:
providing a plurality of sensing elements configured when deployed to be connected together to form a chain;
providing a control element configured when deployed to be connected to the plurality of sensing elements of the chain;
forming a chain comprising the plurality of sensing elements and the control element;
wherein each of the plurality of sensing elements comprises:
a housing,
first and second interfaces, each of the first and the second interfaces being configured to form an electrical and a physical connection to a corresponding interface of another of the plurality of sensing elements or the control element to form the chain;
electrical circuitry formed within the housing, the electrical circuitry comprising
at least one sensor configured to generate an indication of a relative orientation and tilt of the sensing element, and
control circuitry configured to control communication of signals via one or both of the first interface and the second interface to at least one of the other sensing elements and/or the control element;
communicating signals via one or both of the first interface and the second interface to the at least one of the other sensing elements and/or the control element, wherein the signals include an identification signal for identifying the sensing element and the indication representing the orientation and the tilt of each of the plurality of sensing elements in the chain.

Clause 31. The method of clause 30, comprising
attaching an arcuate spring at a connection between each of the sensing elements In conclusion, various embodiments of the invention have been described. The skilled person will appreciate that these embodiments are provided only by way of example, and different features from different embodiments can be combined as appropriate. Furthermore, the details of a sensing apparatus and sensing method will depend upon the particular environment in which the apparatus is installed or the method is used, and the intended application of both the apparatus and the method. Accordingly, the scope of the presently claimed invention is to be defined by the appended claims and their equivalents.

The invention claimed is:
1. A sensor system comprising:
a plurality of sensing elements configured when deployed to be connected together to form a chain;
a control element configured when deployed to be connected to the plurality of sensing elements of the chain, and
each of the plurality of sensing elements comprises:
a housing,
first and second interfaces, each of the first and the second interfaces being configured to form an electrical and a physical connection to a corresponding interface of another of the plurality of sensing elements or the control element to form the chain;
electrical circuitry formed within the housing, the electrical circuitry comprising
at least one sensor configured to generate an indication of a relative orientation and tilt of the sensing element,
control circuitry configured to control communication of signals via one or both of the first interface and the second interface to at least one of the other sensing elements and/or the control element,
wherein the signals communicated via one or both of the first interface and the second interface to the at least one of the other sensing elements and/or the control element include an identification signal for identifying the sensing element and the indication representing the orientation and the tilt of each of the plurality of sensing elements in the chain.

2. A sensor system of claim 1, wherein the control element is configured to analyse the signals received from the first or the second interface of one of the sensing elements of the plurality of sensing elements of the chain to which the control element is connected, to identify an order of the plurality of sensing elements of the chain and/or to compensate for the orientation and tilt of each of the sensing elements of the chain in a deployed position.

3. A sensor system of claim 1,
wherein, the control element is configured to transmit wirelessly the signals received from the first or the second interface of the one of the plurality of sensing elements of the chain to which the control element is connected, to a remote analysis processor via the wireless transceiver, and
the remote analysis processor is configured to analyse the signals received from the control element to identify an order of the plurality of sensing elements of the chain and/or to compensate for the orientation and tilt of each of the sensing elements of the chain in a deployed position.

4. A sensor system of claim 1, wherein the identification signal comprises an identification number of the sensing element.

5. A sensor system of claim 1, wherein the control element is configured to identify the order of the plurality of sensing elements based on the control circuitry of each of the plurality of sensing elements communicating a respective identification signal of the respective sensing element to a first or second neighbouring sensing element of the plurality of sensing elements of the chain or to the control element via one of the first or the second interfaces.

6. A sensor system of claim 1, wherein the electrical circuitry of each of the plurality of sensing elements comprises:
transceiver circuitry configured to communicate the signals via a communications bus formed between the first interface and the second interface, and
addressing circuitry configured to be operable to communicate the identification signal with one of the group consisting of a first neighbouring sensing element or a second neighbouring sensing element of the plurality of sensing elements of the chain to which the sensing element is connected via the first or the second interfaces, respectively, and the addressing circuitry configured to be operable to receive a second identification signal from one of the group consisting of a first neighbouring sensing element or a second neighbouring sensing element of the plurality of sensing elements of the chain to which the sensing element is connected via the first interface or the second interface, respectively.

7. A sensor system of claim 6, wherein, in response to receiving the different identification signal, the control circuit is configured to control the transceiver circuitry to communicate via the communications bus either the different identification signal or an acknowledgment that a different identification signal was received from one of the group consisting of the first neighbouring sensing element or the second neighbouring sensing element of the plurality of sensing elements of the chain.

8. A sensor system of claim 1, wherein the electrical circuitry comprises an electrical energy store and wherein the control circuitry is configured to determine a charge state of the electrical energy store, and wherein the control circuitry is configured to determine whether the charge state exceeds a threshold and to prevent activation of transceiver circuitry if the charge state of the electrical energy store does not exceed the threshold.

9. A sensor system of claim 8, wherein the electrical energy store is a capacitor.

10. A sensor system of claim 1, wherein the at least one sensor configured to generate an indication of a relative orientation and tilt of the sensing elements comprises an accelerometer and a magnetometer, wherein optionally the accelerometer is a tri-axial accelerometer.

11. A sensor system of claim 1, wherein the housing of each of the sensing elements includes a hollow section and one or more vents to allow fluid to displace air present in the hollow section when being deployed.

12. A sensor system of claim 1, wherein each sensing element comprises an arcuate spring, the arcuate spring providing a biasing force with respect to a side of the housing of the sensing element and a surface of a structure in which the sensing element is deployed.

13. A sensor system of claim 1, wherein the housing has a majority portion formed from one of the group comprising carbon fibre, fibreglass, and poly-para-phenylene terephthalamide.

14. A sensor system of claim 1, wherein the housing is an elongated tubular housing.

15. A sensing element comprising:
a housing,
first and second interfaces at either of two ends of the housing, each of the first and the second interfaces being configured to form an electrical and a physical connection to a corresponding interface of another of the plurality of sensing elements or a control element;
electrical circuitry formed within the housing comprising:
at least one sensor configured to generate signals representing a relative orientation and tilt of the sensing element,
control circuitry configured to facilitate communications via one or both of the first interface and the second interface to at least one of the other sensing elements and/or the control element to which the sensing element is connected.

16. The sensing element of claim 15, wherein the electrical circuitry of each of the plurality of sensing elements comprises:
transceiver circuitry configured to communicate the signals via a communications bus formed between the first interface and the second interface, and
addressing circuitry configured to be operable to communicate the identification signal with one of the group consisting of a first neighbouring sensing element or a second neighbouring sensing element of the plurality of sensing elements of the chain to which the sensing element is connected via the first or the second interfaces, respectively, and the addressing circuitry configured to be operable to receive a second identification signal from one of the group consisting of a a first neighbouring sensing element or a second neighbouring sensing element of the plurality of sensing elements of the chain to which the sensing element is connected via the first interface or the second interface, respectively.

17. A sensing element comprising:
housing means including a hollow section, the hollow section comprising one or more vents for allowing air to be displaced from the interior of the hollow rigid body in the presence of water;
first and second interfaces at either of two ends of the housing, each of the first and the second interfaces being configured to form an electrical and a physical connection to a corresponding interface of a different sensing element;
electrical circuitry formed within the housing comprising
at least one sensor configured to generate signals representing a relative orientation and tilt of the sensing element
communication circuitry configured to transmit generated signals from the sensor via the first or second interface.

18. A sensor system of claim 1, the sensor system comprising:
a plurality of sensing elements, each sensing element comprising means for connecting to two other sensing elements of the plurality of sensing elements, the plurality of sensing elements to be connected together to form a chain when deployed;

a control element comprising means for connecting to the plurality of sensing elements of the chain, the control element connected to the plurality of sensing elements of the chain when deployed;

wherein each of the plurality of sensing elements comprises:
a housing,
means for forming an electrical and a physical connection to another of the plurality of sensing elements or the control element to form the chain;
electrical circuitry formed within the housing, the electrical circuitry comprising
at least one means for sensing an indication of a relative orientation and tilt of the sensing element, and
means for communicating signals to at least one of the other sensing elements and/or the control element;
wherein signals communicated via the means for forming an electrical and a physical connection to the at least one of the other sensing elements and/or the control element include an identification signal for identifying the sensing element and the indication representing the orientation and the tilt of each of the plurality of sensing elements in the chain.

19. A method of installing the sensor system of claim 1, the method comprising:
providing a plurality of sensing elements configured when deployed to be connected together to form a chain;
providing a control element configured when deployed to be connected to the plurality of sensing elements of the chain;
forming a chain comprising the plurality of sensing elements and the control element;
wherein each of the plurality of sensing elements comprises:
a housing,
first and second interfaces, each of the first and the second interfaces being configured to form an electrical and a physical connection to a corresponding interface of another of the plurality of sensing elements or the control element to form the chain;
electrical circuitry formed within the housing, the electrical circuitry comprising
at least one sensor configured to generate an indication of a relative orientation and tilt of the sensing element, and
control circuitry configured to control communication of signals via one or both of the first interface and the second interface to at least one of the other sensing elements and/or the control element;
communicating signals via one or both of the first interface and the second interface to the at least one of the other sensing elements and/or the control element, wherein the signals include an identification signal for identifying the sensing element and the indication representing the orientation and the tilt of each of the plurality of sensing elements in the chain.

20. The method of claim 19, comprising
attaching an arcuate spring at a connection between each of the sensing elements.

* * * * *